(12) United States Patent
Keeler et al.

(10) Patent No.: US 12,497,924 B2
(45) Date of Patent: Dec. 16, 2025

(54) FUELDRAULIC ACTUATION

(71) Applicant: ROLLS-ROYCE PLC, London (GB)

(72) Inventors: Benjamin J Keeler, Chesterfield (GB); Craig W Bemment, Derby (GB); Andrea Minelli, Derby (GB); Paul W Ferra, Derby (GB); Alastair G Hobday, Derby (GB); Andrew T Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/753,302

(22) Filed: Jun. 25, 2024

(65) Prior Publication Data
US 2025/0198352 A1    Jun. 19, 2025

(30) Foreign Application Priority Data
Dec. 14, 2023  (GB) ..................... 2319159

(51) Int. Cl.
*F02C 9/18* (2006.01)
*F02C 7/22* (2006.01)

(52) U.S. Cl.
CPC .................. *F02C 9/18* (2013.01); *F02C 7/22* (2013.01); *F05D 2220/323* (2013.01); *F05D 2260/50* (2013.01)

(58) Field of Classification Search
CPC .... F02C 7/22; F02C 7/236; F02C 7/18; F02C 7/185; F02C 7/20; F02C 7/141; F02C 7/32; F02C 7/14; F02C 3/04; F02C 7/232; F23R 3/36
See application file for complete search history.

(56) References Cited

U.S. PATENT DOCUMENTS

| | | |
|---|---|---|
| 4,696,156 A | 9/1987 | Burr et al. |
| 5,121,598 A | 6/1992 | Butler |
| | (Continued) | |

FOREIGN PATENT DOCUMENTS

| | | |
|---|---|---|
| EP | 3044443 B1 | 8/2018 |
| FR | 2969701 A1 | 6/2012 |
| | (Continued) | |

OTHER PUBLICATIONS

Apr. 28, 2025 Notice of Allowance issued in U.S. Appl. No. 18/753,446.

*Primary Examiner* — Thuyhang N Nguyen
(74) *Attorney, Agent, or Firm* — Oliff PLC

(57) ABSTRACT

A gas turbine engine for an aircraft includes an engine core including a turbine, a combustor, a compressor, and a core shaft connecting the turbine to the compressor. The engine includes a fan upstream of the engine core and driven by the core shaft. The engine includes a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is greater than or equal to 4. The engine includes a plurality of actuators and a fuel supply system. The fuel supply system is arranged to supply fuel for combustion in the combustor, and to supply fuel to fueldraulically drive at least ten of the plurality of actuators.

20 Claims, 19 Drawing Sheets

(56) References Cited

U.S. PATENT DOCUMENTS

| | | | |
|---|---|---|---|
| 6,651,441 B2 * | 11/2003 | Reuter | F02C 7/32 417/292 |
| 7,555,905 B2 | 7/2009 | Borcea | |
| 8,286,432 B2 * | 10/2012 | Anson | F02C 7/236 60/734 |
| 8,511,330 B1 * | 8/2013 | Rickis | G05D 16/024 137/625.3 |
| 8,783,040 B2 | 7/2014 | Erickson et al. | |
| 9,500,135 B2 * | 11/2016 | Bader | F02C 7/236 |
| 9,810,150 B2 | 11/2017 | Schmitz et al. | |
| 9,926,844 B2 | 3/2018 | Fujita | |
| 10,508,598 B2 | 12/2019 | Weiner | |
| 10,550,768 B2 * | 2/2020 | Staubach | F02K 3/115 |
| 11,125,161 B2 | 9/2021 | Weiner | |
| 11,982,234 B1 | 5/2024 | Mohammed et al. | |
| 2002/0164249 A1 * | 11/2002 | Strange, Jr. | F02K 1/48 415/211.2 |
| 2003/0074884 A1 * | 4/2003 | Snow | F02C 9/48 60/764 |
| 2003/0136103 A1 | 7/2003 | Reuter et al. | |
| 2004/0011052 A1 | 1/2004 | Clements | |
| 2008/0289339 A1 | 11/2008 | Asti et al. | |
| 2009/0211558 A1 | 8/2009 | Anson et al. | |
| 2011/0185731 A1 | 8/2011 | Mylemans | |
| 2011/0203291 A1 | 8/2011 | Erickson et al. | |
| 2011/0232293 A1 | 9/2011 | Leese | |
| 2012/0032809 A1 | 2/2012 | Comotto et al. | |
| 2012/0045317 A1 | 2/2012 | Saladino | |
| 2012/0227409 A1 | 9/2012 | Paradise | |
| 2012/0324859 A1 | 12/2012 | Foster | |
| 2013/0086909 A1 | 4/2013 | Wang et al. | |
| 2013/0149113 A1 * | 6/2013 | Kohlenberg | F01D 17/14 415/122.1 |
| 2013/0283762 A1 | 10/2013 | Simpson et al. | |
| 2013/0283811 A1 | 10/2013 | Potel et al. | |
| 2013/0340834 A1 * | 12/2013 | Swann | F02C 9/40 702/50 |
| 2015/0101331 A1 | 4/2015 | Goulds et al. | |
| 2016/0108819 A1 | 4/2016 | Dreher et al. | |
| 2016/0131042 A1 * | 5/2016 | Barea-Egana | F02C 7/232 60/734 |
| 2016/0138473 A1 * | 5/2016 | Veilleux, Jr. | F02C 7/22 137/59 |
| 2016/0265438 A1 | 9/2016 | Keeler et al. | |
| 2016/0333783 A1 | 11/2016 | Weiner | |
| 2017/0016401 A1 | 1/2017 | Stockwell | |
| 2017/0058779 A1 | 3/2017 | Harvey et al. | |
| 2017/0175675 A1 | 6/2017 | Sabnis | |
| 2017/0292451 A1 * | 10/2017 | Reuter | F02C 7/22 |
| 2017/0321608 A1 | 11/2017 | Crowley et al. | |
| 2017/0322571 A1 | 11/2017 | Crowley et al. | |
| 2018/0030851 A1 | 2/2018 | Emmons | |
| 2018/0045122 A1 | 2/2018 | Veilleux | |
| 2019/0170065 A1 | 6/2019 | Angevin et al. | |
| 2019/0323426 A1 | 10/2019 | Mackin | |
| 2020/0025078 A1 | 1/2020 | Scothern et al. | |
| 2020/0290741 A1 | 9/2020 | Peace et al. | |
| 2020/0355119 A1 | 11/2020 | Ribarov | |
| 2021/0025331 A1 | 1/2021 | Yates et al. | |
| 2021/0363925 A1 * | 11/2021 | Turney | F02C 7/185 |
| 2022/0178306 A1 | 6/2022 | Durand et al. | |
| 2022/0178544 A1 | 6/2022 | Durand et al. | |
| 2022/0243659 A1 | 8/2022 | Hinderliter | |
| 2022/0403779 A1 | 12/2022 | Walz et al. | |
| 2023/0090415 A1 | 3/2023 | Miller et al. | |
| 2023/0146084 A1 | 5/2023 | Sharma et al. | |
| 2023/0278714 A1 | 9/2023 | Wang et al. | |
| 2023/0323822 A1 | 10/2023 | Bemment et al. | |
| 2023/0399120 A1 | 12/2023 | Thorner et al. | |
| 2024/0003299 A1 | 1/2024 | Oriol et al. | |
| 2024/0011417 A1 | 1/2024 | Sibbach et al. | |
| 2024/0102657 A1 | 3/2024 | Kapat et al. | |
| 2024/0151185 A1 | 5/2024 | Miller et al. | |

FOREIGN PATENT DOCUMENTS

| | | |
|---|---|---|
| GB | 2572753 A | 10/2019 |
| GB | 2572783 A | 10/2019 |

* cited by examiner

FUELDRAULIC ACTUATION

CROSS-REFERENCE TO RELATED APPLICATIONS

This specification is based upon and claims the benefit of priority from UK Patent Application Number 2319159.6 filed on 14 Dec. 2023, the entire contents of which are incorporated herein by reference.

BACKGROUND

Field of the Disclosure

The present disclosure relates to aircraft actuation systems, and to methods of controlling actuation system fueldraulically, such that one or more actuators of the system are fueldraulically actuated.

Description of the Related Art

There is an expectation in the aviation industry of a trend towards the use of fuels different from the traditional kerosene-based jet fuels generally used at present. The fuels may have differing fuel characteristics relative to petroleum-based hydrocarbon fuels. Thus, there is a need to take account of fuel properties for these new fuels, and to adjust both the gas turbine engines themselves and the methods of operating gas turbine engines.

SUMMARY

According to a first aspect there is provided a gas turbine engine for an aircraft comprising:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, wherein the bypass ratio, defined as the ratio of the mass flow rate of the flow through the bypass duct to the mass flow rate of the flow through the core at cruise conditions, is at least 4;
- a plurality of actuators; and
- a fuel supply system, wherein the fuel supply system is arranged to supply fuel for combustion in the combustor, and to supply fuel to fueldraulically drive at least ten of the plurality of actuators.

The inventors have appreciated that the use of fuels different from the traditional kerosene-based jet fuels, such as sustainable aviation fuels, may result in different fuel properties, and that these different fuel properties may enable actuators to be fueldraulically driven. In particular, some fuels may be heated to higher temperatures and used to drive at least one more actuator than traditional fuels, without significantly increasing the risk of thermal degradation of the fuel (e.g., fuel lacquer, or fuel coking) within the actuators.

The bypass ratio may be in the range of 4-55. The bypass ratio may be in the range of 4-20. The bypass ratio may be in the range of 4-15.

The fuel supply system may comprise a fuel return-to-tank valve. The fuel return-to-tank valve may be controlled using a fuel return-to-tank actuator. The fuel supply system may be arranged to supply fuel to fueldraulically drive the fuel return-to-tank actuator.

The fuel supply system may be arranged to supply fuel to fueldraulically drive at least eleven, or at least twelve of the plurality of actuators.

The engine may comprise a variable stator vane system. At least two of the plurality of actuators may be a part of the variable stator vane system and may actuate/move the vanes in use. The fuel supply system may be arranged to supply fuel to fueldraulically drive the at least two of the plurality of actuators which are part of the variable stator vane system.

The engine may comprise a turbine case cooling-TCC-system. At least two of the plurality of actuators may be a part of the turbine case cooling system. The fuel supply system may be arranged to supply fuel to fueldraulically drive the at least two of the plurality of actuators which are part of the TCC system.

The engine may comprise a ventilation valve actuator. The fuel supply system may be arranged to supply fuel to fueldraulically drive the ventilation valve actuator.

The engine may comprise an engine heat management system. The engine heat management system may be arranged to cool oil used to cool and lubricate one or more engine components including shaft bearings and a gearbox (where present). The engine heat management system may be arranged to control fuel temperature on entry to the combustor. The engine heat management system may comprise a plurality of heat exchangers; for example, one or more air-oil heat exchangers and one or more fuel-oil heat exchangers. At least one of the plurality of actuators may be a part of the engine heat management system. The fuel supply system is arranged to supply fuel to fueldraulically drive the at least one of the plurality of actuators within the engine heat management system. Various actuators within the engine heat management system may be used to control fluid flow rate—e.g., air, oil, or fuel flow rate-through one or more heat exchangers of the engine heat management system.

The engine may comprise a generator heat management system. At least one of the plurality of actuators is a part of the generator heat management system. The fuel supply system is arranged to supply fuel to fueldraulically drive the at least one of the plurality of actuators within the generator heat management system.

The engine may comprise a hydro-mechanical unit. At least three of the plurality of actuators may be part of the hydro-mechanical unit. The fuel supply system may be arranged to supply fuel to fueldraulically drive the at least three of the plurality of actuators which are part of the hydro-mechanical unit.

At least four of the plurality of actuators may be part of the hydro-mechanical unit. The fuel supply system may be arranged to supply fuel to fueldraulically drive the at least four of the plurality of actuators which are part of the hydro-mechanical unit.

The engine may comprise a bleed air valve. At least one of the plurality of actuators may be configured to actuate the bleed air valve. The fuel supply system may be arranged to supply fuel to fueldraulically drive the at least one of the plurality of actuators configured to actuate the bleed air valve.

The at least ten fueldraulic actuators (i.e., actuators which are fueldraulic ally driven) may therefore comprise one or more of:

at least one Variable Stator Vane—VSV—actuator arranged to adjust the position of a stator vane of the engine;

at least one actuator arranged to actuate a valve within a Turbine Case Cooling—TCC—system of the engine;

at least one actuator arranged to actuate a valve within a hydro-mechanical unit—HMU—of the engine;

at least one actuator arranged to actuate a ventilation valve;

at least one actuator arranged to actuate a nacelle anti-icing valve or any other anti-icing or de-icing valve;

at least one actuator arranged to actuate a bleed air valve;

at least one actuator arranged to actuate a valve of a conditioning pack;

at least one actuator arranged to actuate a high stage valve for controlling airflow from the compressor;

at least one actuator arranged to actuate a valve for extraction of bleed air from non-compressor parts of the engine;

at least one actuator arranged to actuate an auxiliary power unit—APU—bleed air valve (in some implementations however, the APU may be separate from the engine and an APU actuator may therefore not be classed as a part of the engine. Fuel from a part of a fuel supply path upstream of the engine may be used to actuate such an APU actuator. In other implementations, however, the APU may be associated with, or a part of, the engine and the AP actuator may be classed as a part of the engine in such cases.);

an engine start valve actuator;

an isolation valve actuator;

at least one actuator arranged to actuate a valve of an engine heat management system; and/or at least one actuator arranged to actuate a valve of a generator heat management system.

For example, an engine heat management system generally comprises multiple servomotors (also referred to as servos), a servo being a rotary or linear actuator that allows for precise control of angular or linear position, velocity, and/or acceleration in a mechanical system. In a given engine heat management system, one, some, or all of the servos present may be fueldraulically actuated. One or more of the servos may comprise a sensor arranged to provide position feedback. A dedicated controller may be provided for the engine heat management system to control the one or more servos. The same may apply to a generator heat management system.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine may comprise a plurality of actuated engine systems. The actuated engine systems may include one or more of: a heat management system, a turbine case cooling system, a generator heat management system, an engine heat management system, a bleed air system, a variable stator vane-VSV-system, a cabin environmental control system, a de-icing system, and a bearing chamber venting system.

The fuel supply system may be arranged to supply fuel to fueldraulically drive at least three of the plurality of actuated engine systems. The fuel supply system may be arranged to supply fuel to fueldraulically drive at least four, five, six, or at least seven, of the actuated engine systems.

It will be appreciated that each actuated engine system may comprise multiple actuators, and that not all actuators of a given system may be fueldraulic. Fueldraulically driving a given system therefore comprises actuating at least one, but not necessarily all, actuators of the system.

At least one of the plurality of actuated engine systems may comprise at least two of the plurality of actuators. The fuel supply system may arranged to supply fuel to fueldraulically drive at least one of the at least two of the plurality of actuators within the at least one actuated engine system. The fuel supply system may be arranged to supply fuel to fueldraulically drive each of the at least two of the plurality of actuators within the at least one actuated engine system.

According to a second aspect, there is provided a method of operating a gas turbine engine for an aircraft, the engine comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators; and a fuel supply system;

the method comprising:
supplying, using the fuel supply system, fuel for combustion in the combustor; and
supplying, using the fuel supply system, fuel to fueldraulically drive at least ten of the plurality of actuators.

The method of the second aspect may be performed using the engine of the first aspect.

According to a third aspect, there is provided a gas turbine engine for an aircraft comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuated engine systems, including a heat management system and a turbine case cooling system; and a fuel supply system, wherein the fuel supply system is arranged to supply fuel for combustion in the combustor, and to supply fuel to fueldraulically drive at least three of the plurality of actuated engine systems.

Fueldraulically driving an actuated engine system may mean fueldraulically driving at least one actuator within the actuated engine system.

The actuated engine systems may include one or more of: a heat management system, a turbine case cooling system, a generator heat management system, an engine heat management system, a bleed air system, a variable stator vane-VSVsystem, a cabin environmental control system, a de-icing system, and a bearing chamber venting system.

The fuel supply system may be arranged to supply fuel to fueldraulically drive at least four, five, six, or seven, of the plurality of actuated engine systems.

The bypass ratio may be in the range of 4-55. The bypass ratio may be in the range of 4-20. The bypass ratio may be in the range of 4-15.

The fuel supply system may be arranged to supply fuel to fueldraulically drive the turbine case cooling system.

The engine may comprise an engine heat management system. The fuel supply system may be arranged to supply fuel to fueldraulically drive the engine heat management system.

The engine may comprise a generator heat management system. The fuel supply system may be arranged to supply fuel to fueldraulically drive the generator heat management system.

The engine may comprise a ventilation valve system. The fuel supply system may be arranged to supply fuel to fueldraulically drive the ventilation valve system.

The engine may comprise a bleed air system. The fuel supply system may be arranged to supply fuel to fueldraulically drive the bleed air system.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine may comprise a plurality of actuators. The fuel supply system may be arranged to supply fuel to fueldraulically drive at least ten, eleven, or twelve, of the plurality of actuators.

At least one of the actuated engine systems may comprise at least two of the plurality of actuators. The fuel supply system may be arranged to supply fuel to fueldraulically drive at least one of those at least two actuators within the at least one actuated engine system.

At least one of the actuated engine systems may comprise at least two of the plurality of actuators. The fuel supply system may be arranged to supply fuel to fueldraulically drive each of those at least two actuators within the at least one actuated engine system.

The engine of the third aspect may be arranged to perform the method of the second aspect, and may have any of the features described with respect to the first or second aspect.

According to a fourth aspect, there is provided method of operating a gas turbine engine for an aircraft, the engine comprising:
  an engine core comprising a turbine, a combustor, a compressor, and a core shaft connecting the turbine to the compressor;
  a fan located upstream of the engine core and arranged to be driven by the core shaft (26), the fan comprising a plurality of fan blades;
  a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
  a plurality of actuated engine systems including a heat management system and a turbine case cooling system; and
  a fuel supply system;

and wherein the method comprises:
  supplying, using the fuel supply system, fuel for combustion in the combustor; and
  supplying, using the fuel supply system, fuel to fueldraulically drive at least three of the plurality of actuated engine systems.

The method may comprise supplying, using the fuel supply system, fuel to fueldraulically drive at least four or five of the plurality of actuated engine systems.

The engine may comprise an engine heat management system and a generator heat management system. The method may comprise supplying fuel to fueldraulically drive one or both of the engine heat management system and the generator heat management system.

The methods of the second and fourth aspects may be complementary, and may be performed together in various implementations. The method of the fourth aspect may be performed using the engine of the first aspect or the third aspect.

According to a fifth aspect, there is provided a gas turbine engine for an aircraft comprising:
  an engine core comprising a turbine, a combustor, a compressor, and a core shaft connecting the turbine to the compressor;
  a fan located upstream of the engine core and arranged to be driven by the core shaft, the fan comprising a plurality of fan blades;
  a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
  a plurality of actuators, wherein at least one of the plurality of actuators is configured to actuate a bleed air valve; and
  a fuel supply system, wherein the fuel supply system is arranged to supply fuel for combustion in the combustor, and to supply fuel to fueldraulically drive the at least one actuator configured to actuate the bleed air valve.

The bypass ratio may be in the range of 4-55. The bypass ratio may be in the range of 4-20. The bypass ratio may be in the range of 4-15.

The flow of bleed air may therefore be fueldraulically controlled. Bleed air generally comprises air "bled" from the one or more compressors of the engine, and/or from an auxiliary power unit (APU). The aircraft may comprise a bleed air system comprising a plurality of ducts, valves, and regulators arranged to conduct this medium- to high-pressure air "bled" from the compressor(s) and/or APU to various locations within the aircraft (both within the engine and elsewhere). Bleed air may be used for multiple different functions, including cabin pressurisation, air conditioning, engine start, bearing chamber venting, and de-icing At least part of the aircraft's bleed air system may form a part of, or be contained within, the engine—this portion may be referred to as an engine bleed air system. The aircraft's bleed air system may comprise multiple bleed air systems, some of which are fully located within an engine.

The at least one bleed air valve may be an environmental bleed air valve. The bleed air may therefore be used to provide pressure for the aircraft cabin, supplying air to an environmental control system. The at least one bleed air valve may be a conditioning pack valve. The pack valve—an example of an environmental bleed air valve—may regulate bleed air flow into an air cycle air conditioning system.

Additionally or alternatively, the bleed air may be used to keep critical parts of the aircraft (such as the leading edges of the wings, parts of a nacelle surrounding the fan, and/or an engine section stator) ice-free. The bleed air valve may be referred to as an anti-icing valve.

The at least one bleed air valve may be a nacelle anti-icing valve.

The at least one bleed air valve may be an engine section stator anti-icing valve.

The engine may comprise an isolation valve configured to enable input of bleed air from an external engine—i.e. the isolation valve may allow air cross-fed from the other/another engine of the same aircraft (it will be appreciated that a minimum of two engines-one per wing—are generally present for commercial aircraft, and that many aircraft have multiple engines per wing, e.g. for a total of four or six engines. Bleed air may therefore be shared between engines.). At least one of the plurality of actuators may be configured to actuate the isolation valve. The fuel supply system may be arranged to supply fuel to fueldraulically drive the at least one actuator configured to actuate the isolation valve.

The engine may comprise an engine starter valve. At least one of the plurality of actuators may be configured to actuate the engine starter valve. The fuel supply system may be arranged to supply fuel to fueldraulically drive the at least one actuator configured to actuate the engine starter valve. Bleed air, extracted from either an Auxiliary Power Unit (APU) or an operating engine of the aircraft may therefore be used to power an air turbine starter motor to start an engine/another engine of the aircraft. Using an air turbine starter may allow a smaller and lighter unit to provide the required torque as compared to electrically or hydraulically powered starters. Fueldraulic control of the engine starter valve may further reduce size and/or weight of the system.

The engine may comprise a high stage valve for controlling airflow from the compressor. At least one of the plurality of actuators may be configured to actuate the high stage valve. The fuel supply system may be arranged to supply fuel to fueldraulically drive the at least one actuator configured to actuate the high stage valve. The high stage valve may be configured to control the flow of high-pressure bleed air from the compressor to the aircraft cabin.

The engine may comprise, or have associated therewith, an auxiliary power unit-APU—and an auxiliary power unit valve. The APU may be separate from the engine, and mounted elsewhere on the aircraft in some implementations. At least one of the plurality of actuators may be configured to actuate the auxiliary power unit valve. The fuel supply system may be arranged to supply fuel to fueldraulically drive the at least one actuator configured to actuate the auxiliary power unit valve.

The engine may comprise a manifold pressure valve. At least one of the plurality of actuators may be configured to actuate the manifold pressure valve. The fuel supply system may be arranged to supply fuel to fueldraulically drive the at least one actuator configured to actuate the manifold pressure valve. The manifold pressure valve may be configured to control the flow of high-pressure bleed air from the engine. The manifold pressure valve may modulate/control the pressure of bleed air flow from the compressor to the aircraft cabin.

The fuel supply system may be arranged to supply fuel to fueldraulically drive at least ten, at least, eleven, or at least twelve, of the plurality of actuators.

The engine may comprise a plurality of actuated engine systems. The plurality of actuated engine system may include a heat management system and a turbine case cooling system. The fuel supply system may be arranged to supply fuel to fueldraulically drive at least three of the plurality of actuated engine systems.

The actuated engine systems may include one or more of: a heat management system, a turbine case cooling system, a generator heat management system, an engine heat management system, a bleed air system, a variable stator vane-VSV-system, a cabin environmental control system, a de-icing system, and a bearing chamber venting system.

The fuel supply system may be arranged to supply fuel to fueldraulically drive at least four, five, six, or at least seven of the actuated engine systems.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine of the fifth aspect may be arranged to perform the method of the second and/or fourth aspect, and may have any of the features described with respect to the first to fourth aspects.

According to a sixth aspect there is provided a method of operating a gas turbine engine for an aircraft, the engine comprising:
  an engine core comprising a turbine, a combustor, a compressor, and a core shaft connecting the turbine to the compressor;
  a fan located upstream of the engine core and arranged to be driven by the core shaft, the fan comprising a plurality of fan blades;
  a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
  a plurality of actuators, wherein at least one of the plurality of actuators is configured to actuate a bleed air valve; and
  a fuel supply system;
  and wherein the method comprises:
  supplying, using the fuel supply system, fuel for combustion in the combustor; and
  supplying, using the fuel supply system, fuel to fueldraulically drive the at least one actuator configured to actuate the bleed air valve.

The engine may comprise multiple bleed air valves. The method may comprise supplying, using the fuel supply system, fuel to fueldraulically drive a plurality of actuators each configured to actuate a bleed air valve.

The methods of the second, fourth and sixth aspects may be complementary, and may be performed together, or in any combination or sub-combination, in various implementations. The method of the sixth aspect may be performed using the engine of the first aspect, third aspect, or fifth aspect.

According to a seventh aspect there is provided a gas turbine engine for an aircraft comprising:
  an engine core comprising a turbine, a combustor, a compressor, and a core shaft connecting the turbine to the compressor;
  a fan located upstream of the engine core and arranged to be driven by the core shaft (26), the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

an engine heat management system;

a plurality of actuators, comprising an actuator configured to actuate at least one valve within the engine heat management system;

a fuel supply system, wherein the fuel supply system is arranged to supply fuel for combustion in the combustor, and to supply fuel to fueldraulically drive the actuator configured to actuate the at least one valve within the engine heat management system;

wherein the actuator configured to actuate the at least one valve within the engine heat management system is configured to actuate said valve so as to enable non-binary position adjustment between an open valve position and a closed valve position.

The actuator configured to actuate the at least one valve within the engine heat management system may be configured to actuate said valve so as to enable position adjustment between an open valve position, one or more discrete intermediate valve positions, and a closed valve position. The non-binary position adjustment may therefore comprise discrete position adjustment between at least three different valve positions. The actuator may be configured to actuate the valve between at least four set positions. For example, the actuator may be configured to actuate the valve between four set positions-open, closed, and two discrete/set intermediate positions.

The actuator configured to actuate the at least one valve within the engine heat management system may be configured to actuate said valve so as to enable continuous position adjustment between an open valve position and a closed valve position.

The bypass ratio may be in the range of 4-55. The bypass ratio may be in the range of 4-20. The bypass ratio may be in the range of 4-15.

The engine heat management system may comprise a plurality of valves.

The actuator configured to actuate the at least one valve within the engine heat management system may be configured to actuate at least two of the plurality of valves within the engine heat management system.

The plurality of actuators may comprise a plurality of actuators each configured to actuate at least one of the plurality of valves within the engine heat management system.

The engine may comprise a bleed air valve. The plurality of actuators may comprise an actuator configured to actuate the bleed air valve. The fuel supply system may be arranged to supply fuel to fueldraulically drive the actuator configured to actuate the bleed air valve.

The engine may comprise a generator heat management system. The plurality of actuators may comprise an actuator configured to actuate at least one valve within the generator heat management system. The fuel supply system may be arranged to supply fuel to fueldraulically drive the actuator configured to actuate the at least one valve within the generator heat management system.

The generator heat management system may comprise a plurality of valves.

The at least one actuator configured to actuate the at least one valve within the generator heat management system may be configured to actuate at least two of the plurality of valves within the generator heat management system.

The plurality of actuators may comprise a plurality of actuators each configured to actuate at least one of the plurality of valves with the generator heat management system.

The actuator configured to actuate the at least one valve within the generator heat management system may be configured to actuate the at least one valve within the generator heat management system so as to enable continuous position adjustment between an open valve position and a closed valve position.

The fuel supply system may be arranged to supply fuel to fueldraulically drive at least ten, eleven, or at least twelve of the plurality of actuators.

The engine may comprise a plurality of actuated engine systems. The engine systems may include a heat management system and a turbine case cooling system. The engine systems may include a VSV actuation system, one or more de-icing systems, and/or a cabin air conditioning system. The fuel supply system may be arranged to supply fuel to fueldraulically drive at least three of the plurality of actuated engine systems.

The fuel supply system may be arranged to supply fuel to fueldraulically drive at least four, five, six, or seven of the actuated engine systems.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine heat management system may comprise an air-oil heat exchanger. The actuator configured to actuate at least one valve within the engine heat management system may be configured to actuate an air-side valve of the air-oil heat exchanger. The actuator may therefore control air flow. The actuator configured to actuate at least one valve within the engine heat management system may be configured to actuate an oil-side valve of the air-oil heat exchanger. The actuator may therefore control oil flow.

The engine heat management system may comprise one or more, and optionally a plurality of, air-oil heat exchangers.

The engine heat management system may comprise one or more, and optionally a plurality of, fuel-oil heat exchangers.

One or more of, and optionally each of, the plurality of heat exchangers may comprise a valve controllable via an associated actuator. The fuel supply system may be arranged so as to supply fuel to fueldraulically drive each of the associated actuators.

The at least one valve within the engine heat management system may be configured to enable oil to bypass one or more of the plurality of air-oil heat exchangers.

The at least one valve within the engine heat management system may be configured to enable air to bypass one or more of the plurality of air-oil heat exchangers.

The at least one valve within the engine heat management system may be configured to enable fuel to bypass one or more of the plurality of fuel-oil heat exchangers.

The at least one valve within the engine heat management system may be configured to enable oil to bypass one or more of the plurality of fuel-oil heat exchangers.

The portion of fluid being enabled to bypass a respective heat exchanger may be adjustable.

The engine of the seventh aspect may be arranged to perform the method of the second, fourth and/or sixth aspect, and may have any of the features described with respect to the first to sixth aspects.

According to an eighth aspect, there is provided a method of operating a gas turbine engine for an aircraft, the engine comprising:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
- an engine heat management system;
- a plurality of actuators, comprising an actuator configured to actuate a valve within the engine heat management system, wherein the actuator configured to actuate a valve within the engine heat management system is configured to actuate said valve so as to enable non-binary position adjustment between an open valve position and a closed valve position; and
- a fuel supply system;
- and wherein the method comprises:
- supplying, using the fuel supply system, fuel for combustion in the combustor; and
- supplying, using the fuel supply system, fuel to fueldraulically drive at least the engine heat management system valve actuator of the plurality of actuators.

The position adjustment may be continuous, or may be discrete between three or more, and optionally between four or more, different positions, The methods of the second, fourth, sixth, and eighth aspects may be complementary, and may be performed together, or in any combination or sub-combination, in various implementations. The method of the eighth aspect may be performed using the engine of the first aspect, third aspect, fifth aspect, or seventh aspect.

According to a ninth aspect, there is provided a gas turbine engine for an aircraft comprising:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
- a generator heat management system;
- a plurality of actuators, comprising an actuator configured to actuate at least one valve within the generator heat management system; and
- a fuel supply system, wherein the fuel supply system is arranged to supply fuel for combustion in the combustor, and to supply fuel to fueldraulically drive the actuator configured to actuate the at least one valve within the generator heat management system;
- wherein the actuator configured to actuate the at least one valve within the generator heat management system is configured to actuate said valve so as to enable non-binary position adjustment between an open valve position and a closed valve position.

The actuator configured to actuate the at least one valve within the generator heat management system may be configured to actuate said valve so as to enable position adjustment between an open valve position, one or more discrete intermediate valve positions, and a closed valve position. The non-binary position adjustment may therefore comprise discrete position adjustment between at least three different valve positions. The actuator may be configured to actuate the valve between at least four set positions. For example, the actuator may be configured to actuate the valve between four set positions-open, closed, and two intermediate positions.

The actuator configured to actuate the at least one valve within the generator heat management system may be configured to actuate said valve so as to enable continuous position adjustment between an open valve position and a closed valve position.

The bypass ratio may be in the range of 4-55. The bypass ratio may be in the range of 4-20. The bypass ratio may be in the range of 4-15.

The generator heat management system may be arranged to control the temperature of a generator by cooling oil used to cool and lubricate the generator, so transferring heat away from the generator.

The generator heat management system may comprise a plurality of heat exchangers; for example, one or more air-oil heat exchangers and one or more fuel-oil heat exchangers. The actuator may be arranged to control fluid flow of a fluid through one or more of the heat exchangers—e.g. oil flow, air flow, or fuel flow.

The engine may comprise a plurality of generators. The generator heat management system may be configured to manage the temperature of all of the plurality of generators. The engine may comprise a plurality of generator heat management systems, each system being associated with a corresponding one of the plurality of generators.

The generator heat management system may comprise a plurality of valves. The at least one actuator configured to actuate the at least one valve within the generator heat management system may be configured to actuate at least two of the plurality of valves within the generator heat management system.

The generator heat management system may comprise a plurality of valves. The plurality of actuators may comprise a plurality of actuators configured to actuate at least one of the plurality of valves within the generator heat management system.

The engine may comprise an environmental bleed valve. The plurality of actuators may comprise an actuator configured to actuate the environmental bleed valve. The fuel supply system may be arranged to supply fuel to fueldraulically drive the actuator configured to actuate the environmental bleed valve.

The engine may comprise an engine heat management system. The plurality of actuators may comprise an actuator configured to actuate at least one valve within the engine heat management system. The fuel supply system may be arranged to supply fuel to fueldraulically drive the actuator configured to actuate the at least one valve within the engine heat management system.

The engine heat management system may comprise a plurality of valves.

The at least one actuator configured to actuate the at least one valve within the engine heat management system may be configured to actuate at least two of the plurality of valves within the engine heat management system.

The plurality of actuators may comprise a plurality of actuators each configured to actuate at least one of the plurality of valves within the engine heat management system.

The actuator configured to actuate the at least one valve within the engine heat management system may be configured to actuate the at least one valve within the engine heat management system so as to enable continuous position adjustment between an open valve position and a closed valve position.

The fuel supply system may be arranged to supply fuel to fueldraulically drive at least ten, eleven, or at least twelve of the plurality of actuators.

The engine may comprise a plurality of actuated engine systems. The engine actuation systems may include a hydromechanical unit system and a Turbine Case Cooling system. The fuel supply system may be arranged to supply fuel to fueldraulically drive at least three of the plurality of actuated engine systems.

The fuel supply system may be arranged to supply fuel to fueldraulically drive at least four, five, six, or seven of the actuated engine systems.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine of the ninth aspect may be arranged to perform the method of the second, fourth, sixth, and/or eighth aspect, and may have any of the features described with respect to the first to eighth aspects.

According to a tenth aspect, there is provided a method of operating a gas turbine engine for an aircraft, the engine comprising:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
- a generator heat management system;
- a plurality of actuators, comprising an actuator configured to actuate a valve within the generator heat management system, wherein the actuator configured to actuate a valve within the generator heat management system is configured to actuate said valve so as to enable non-binary position adjustment between an open valve position and a closed valve position; and
- a fuel supply system;

and wherein the method comprises:
supplying, using the fuel supply system, fuel for combustion in the combustor; and
supplying, using the fuel supply system, fuel to fueldraulically drive at least the generator heat management system valve actuator of the plurality of actuators.

The position adjustment may be continuous, or may be discrete between three or more, and optionally between four or more, different positions, The methods of the second, fourth, sixth, eighth, and tenth aspects may be complementary, and may be performed together, or in any combination or sub-combination, in various implementations. The method of the tenth aspect may be performed using the engine of the first aspect, third aspect, fifth aspect, seventh aspect, or ninth aspect.

It will be appreciated that a feature described with respect to one aspect may be used in combination with any other aspect, mutatis mutandis.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 Nkg$^{-1}$s to 90 Nkg$^{-1}$s. Purely by way of non-limitative example, the specific thrust of a direct drive gas turbine engine having a fan diameter in the range of from 300 cm to 340 cm may be in the range of from 90 Nkg$^{-1}$s to 120 Nkg$^{-1}$s.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to a nominal point in, or one or more nominal periods during, an aircraft flight cycle between take-off and landing, where a relative increase in altitude is required, which may require an additional thrust demand of the engine.

As used herein, cruise conditions, which may define the cruise phase (or a portion thereof) of the aircraft flight, have the conventional meaning and would be readily understood by the skilled person. In some examples, for a given gas turbine engine for an aircraft, cruise conditions may refer to an the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance-between top of climb and start of descent). Cruise conditions may thus define an operating point, phase, or portion thereof, of the flight that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. During either or both of descent and approach, the engine may be producing between 0% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to an operating point, phase, or portion thereof, of the aircraft flight, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product of their relationship. For example, the Skilled Person would understand that where parameter A is disclosed in separation to parameter B, a product of their relationship may be expressed as, for example, A/B, B/A, B*A, or any such further application, combination, or function of parameter A relative to parameter B, as required.

BRIEF DESCRIPTION OF THE DRAWINGS

Implementations will now be described by way of example only, with reference to the Figures, in which.

DETAILED DESCRIPTION OF THE DISCLOSURE

Figure 1:
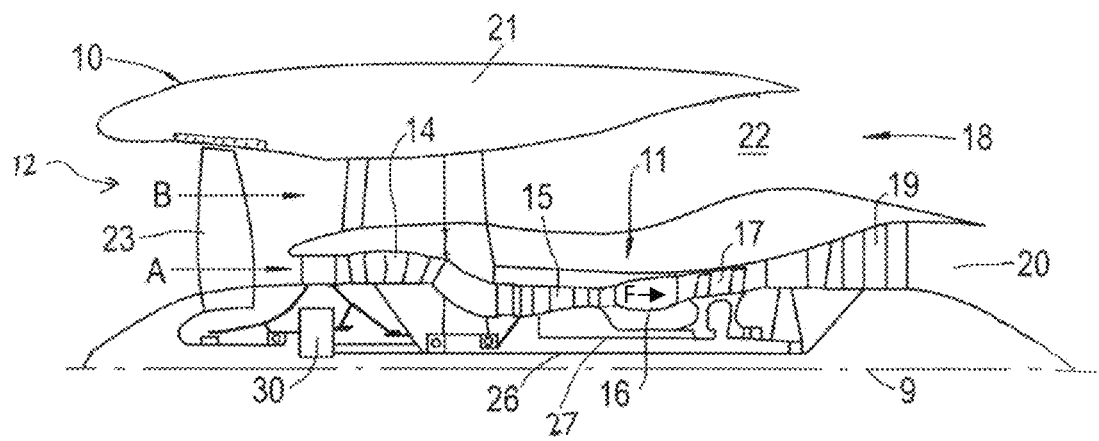
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
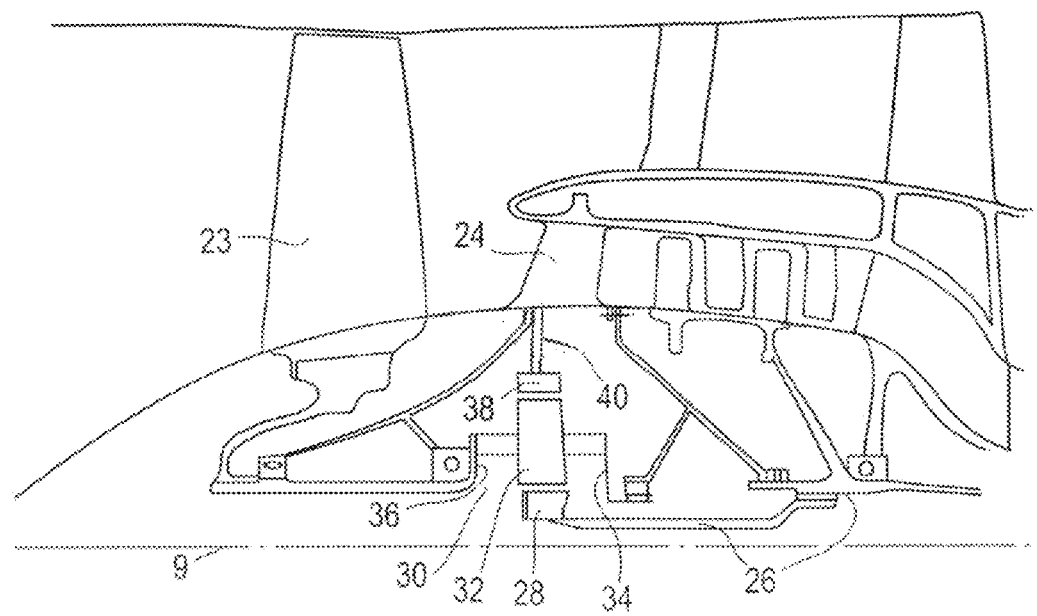
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
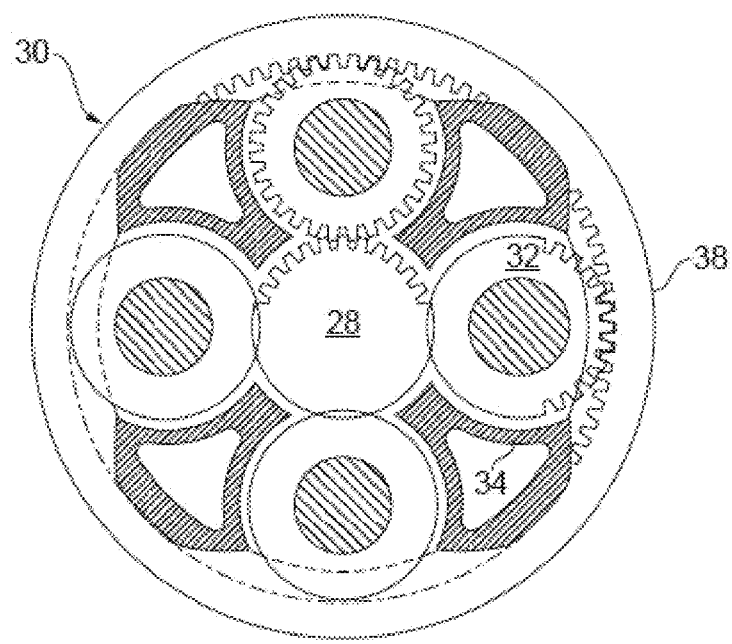
FIG. 3 is a partially cut-away view of a gearbox for a gas turbine engine

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 4.

Figure 4:
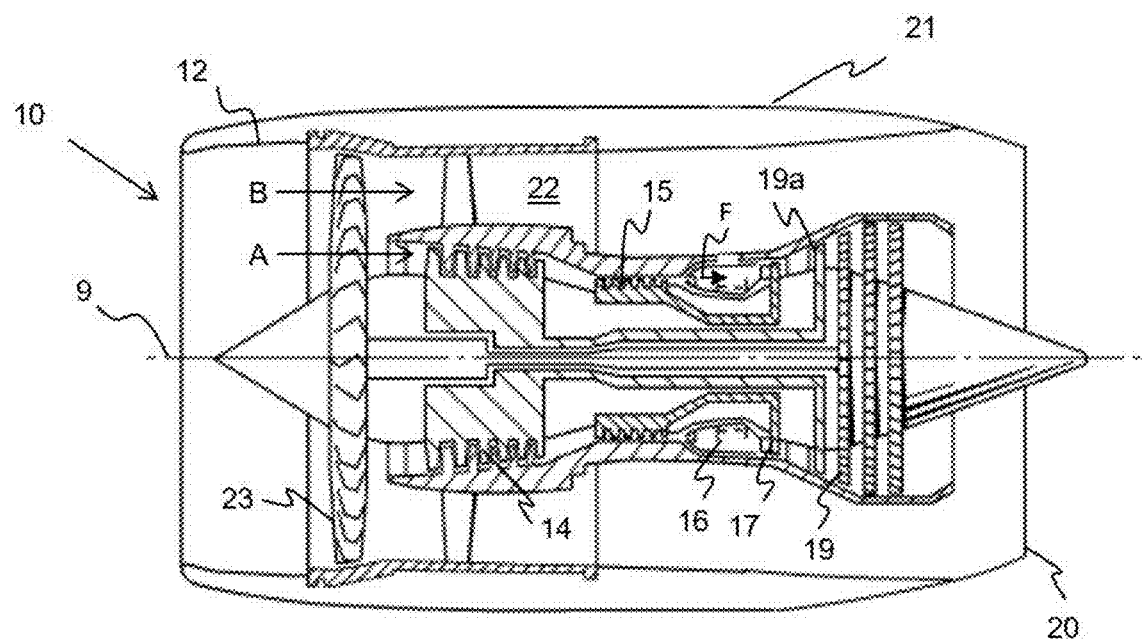
FIG. 4 is a close up sectional side view of an upstream portion of a direct drive gas turbine engine.

With reference to FIG. 4, a gas turbine engine is generally indicated at 10, having a principal rotational axis 9. The engine 10 comprises, in axial flow series, an air intake 12, a propulsive fan 23, an intermediate pressure compressor 14, a high pressure compressor 15, combustion equipment 16, a high pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, carinata, and pennycress; non-biogenic alternative fuels; jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides (NOx); carbon monoxide (CO); carbon dioxide ($CO_2$); unburned hydrocarbons (UHC); sulphur oxides (SO) including, for example, sulphur dioxide ($SO_2$) and/or sulphur trioxide (SOs); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (C) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of between 90% and 98% that of kerosene and a calorific value of between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; lower NOx; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 5:
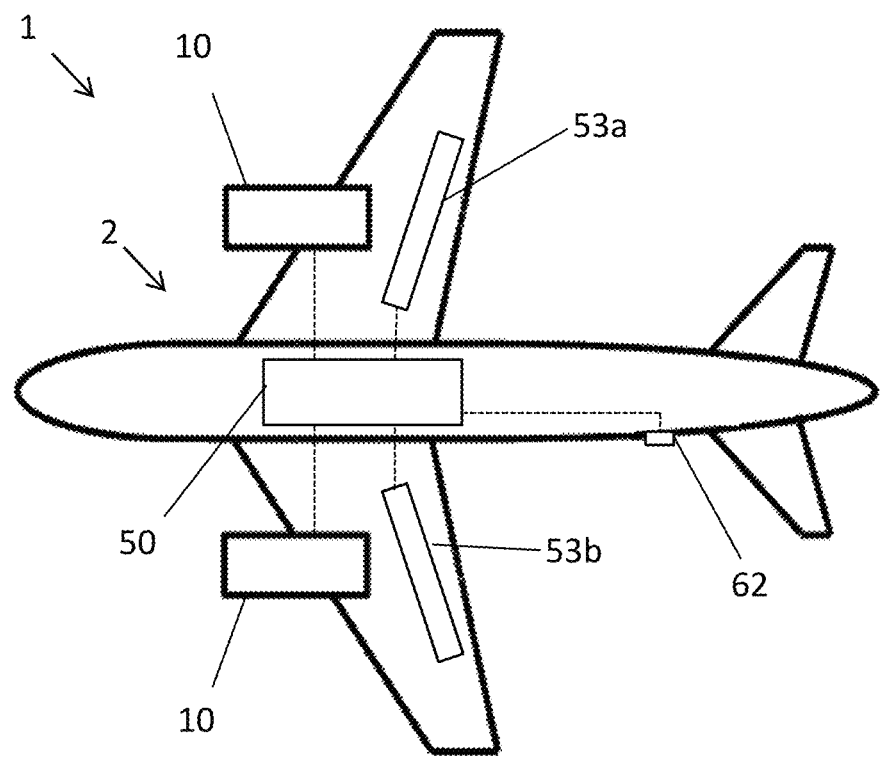
FIG. 5 is a representation of an aircraft with a propulsion system including two gas turbine engines.

As depicted in FIG. 5, an aircraft 1 may comprise multiple fuel tanks 50, 53*a, b*; for example a larger, primary fuel tank 50 located in the aircraft fuselage, and a smaller fuel tank 53*a*, 53*b* located in each wing. In other examples, an aircraft 1 may have only a single fuel tank 50, and/or the wing fuel tanks 53*a, b* may be larger than the central fuel tank 50, or no central fuel tank 50 may be provided (with all fuel instead being stored in the aircraft's wings)—it will be appreciated that many different tank layouts are envisaged and that the examples pictured are provided for ease of description and not intended to be limiting.

FIG. 5 shows an aircraft 1 with a propulsion system 2 comprising two gas turbine engines 10. The gas turbine engines 10 are supplied with fuel from a fuel supply system onboard the aircraft 1. The fuel supply system of the example pictured comprises a single fuel source. For the purposes of the present application the term "fuel source" means either 1) a single fuel tank or 2) a plurality of fuel tanks which are fluidly interconnected. Each fuel source is arranged to provide a separate source of fuel (i.e., a first fuel source may contain a first fuel having a different characteristic or characteristics from a second fuel contained in a second fuel source). First and second fuel sources are therefore not fluidly coupled to each other so as to separate the different fuels (at least under normal running conditions). The use of multiple fuel sources allows an aircraft 1 to carry multiple different fuels, and to change which fuel is being used during operation, and optionally even whilst at cruise or when changing between different stages of operation in flight.

In the present example, the first (and, in these examples, only) fuel source comprises a centre fuel tank 50, located primarily in the fuselage of the aircraft 1 and a plurality of wing fuel tanks 53*a*, 53*b*, where at least one wing fuel tank is located in the port wing and at least one wing fuel tank is located in the starboard wing for balancing. All of the tanks 50, 53*a, b* are fluidly interconnected in the example shown, so forming a single fuel source. Each of the centre fuel tank 50 and the wing fuel tanks 53*a, b* may comprise a plurality of fluidly interconnected fuel tanks.

In another example, the wing fuel tanks 53*a*, 53*b* may not be fluidly connected to the central tank 50, so forming a separate, second fuel source. For balancing purposes, one or more fuel tanks in the port wing may be fluidly connected to one or more fuel tanks in the starboard wing. This may be done either via a centre fuel tank (if that tank does not form part of the other fuel source), or bypassing the centre fuel tank(s), or both (for maximum flexibility and safety). In another example, the first fuel source comprises wing fuel tanks 53 and a centre fuel tank 50, while a second fuel source comprises a further separate centre fuel tank. Fluid interconnection between wing fuel tanks and the centre fuel tank of the first fuel source may be provided for balancing of the aircraft 1. In aircraft 1 with multiple fuel sources, two or more of the fuel sources may therefore contain different fuels from each other, such that the aircraft 1 can change fuel in flight. Being able to determine which fuel is being provided to the combustor 16 may therefore be more complex than simply recording a single identity of a fuel onboard the aircraft 1, or checking once at start-up.

In some examples, the allocation of fuel tanks 50, 53 available on the aircraft 1 may be constrained such that the first fuel source and the second fuel source are each substantially symmetrical with respect to the aircraft centre line. In cases where an asymmetric fuel tank allocation is permitted, a suitable means of fuel transfer is generally provided between fuel tanks of the first fuel source and/or between fuel tanks of the second fuel source such that the position of the aircraft's centre of mass can be maintained within acceptable lateral limits throughout the flight.

Aircraft generally refuel at multiple different airports, for example at the beginning and end of a long-distance flight. Whilst there are standards with which all aviation fuels must be compliant, as mentioned above, different aviation fuels have different compositions, for example depending on their source (e.g. different petroleum sources, biofuels or other synthetic aviation fuels (often described as sustainable aviation fuels-SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, fuel composition of the available aviation fuel may vary between batches even for a given airport or fuel supplier. Further, fuel tanks 50, 53 of aircraft 1 are usually not emptied before being topped up for a subsequent flight, resulting in mixtures of different fuels within the tanks-effectively a fuel with a different composition resulting from the mixture. One or more fuel ports 62 may be provided for refuelling.

The fuel supply system 152 comprises a main fuel flow path 110 from the fuel tank 50 to the combustor 16 of the gas turbine engine 10, and various branching fuel pathways taking fuel from, or returning fuel to, that main fuel flow path 110.

Figure 6:
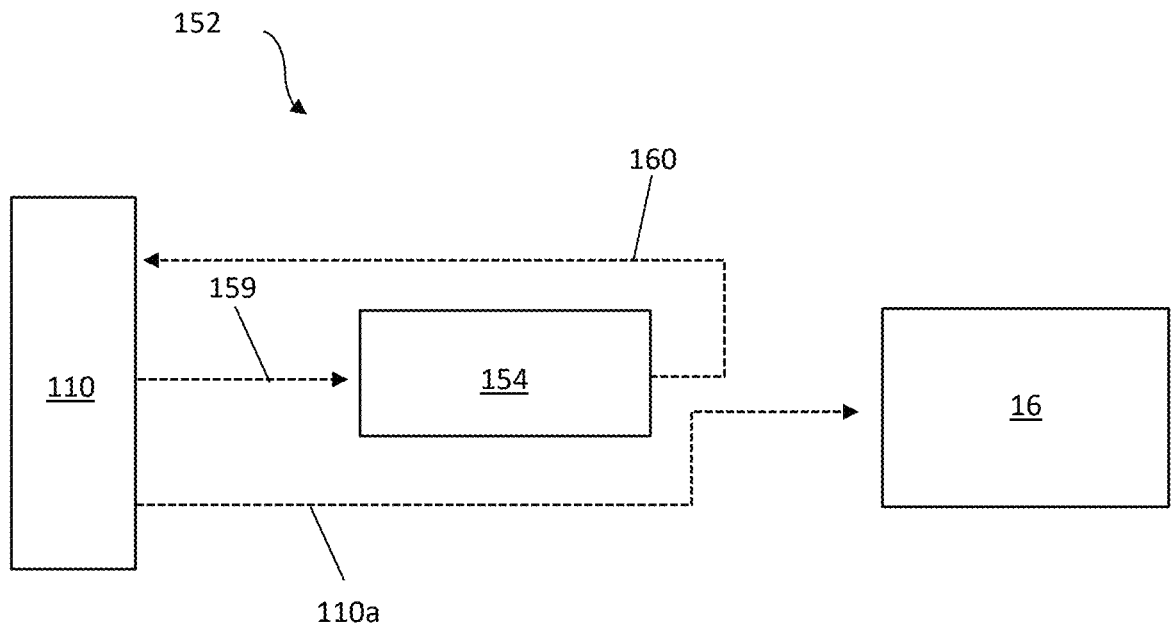
FIG. 6 is a schematic representing a portion of a fuel supply system comprising a fueldraulic actuator.

FIG. 6 shows a schematic diagram representing a portion of a fuel supply system 152 of a gas turbine engine 10. The main fuel flow path 110 of the fuel supply system 152 acts as a source of fuel for fueldraulic systems. The gas turbine engine 10 comprises a combustor 16 and an actuator 154. The dashed arrows in FIG. 6 represent the direction of fuel flow.

The fuel supply system 152 is arranged to supply fuel for combustion in the combustor 16.

It will be appreciated that one or more valves, pumps, sensors, offtakes for fueldraulic actuators, and heat exchangers may be present along the main fuel flow path 110, among other engine components. Fuel is supplied to the combustor 16 directly via line 110a, after passing through whichever prior engine component along the main fuel flow path 110 is furthest downstream.

The fuel travelling via lines 159 and 160 is used to drive (i.e., actuate) the actuator 154. As such, actuator 154 is fueldraulically driven. The term "fueldraulic" used herein refers to the hydraulic operation of an actuator with the hydraulic liquid being fuel. Actuators which are driven fueldraulically may be referred to herein as "fueldraulic actuators".

Fuel travels to the actuator 154 from the fuel flow path 110 via line 159. After being used to fueldraulically drive the actuator 154, the fuel is returned to the main fuel flow path 110, via line 160, and may then be delivered to the combustor 16.

The fuel return line 160 may comprise a valve configured to regulate the flow of fuel back to the main fuel path 110, and the valve may be operable using a fueldraulic actuator. The fuel return line 160 may direct fuel to a location along the main fuel flow path 110 which is before or after one or more heat exchangers of the main fuel flow path 110.

Once the fuel reaches the combustor 16, it is combusted to provide thrust, as explained in relation to FIG. 1.

FIG. 6 shows a single fueldraulic actuator 154 on the fuel flow loop 159, 160. In alternative implementations, multiple fueldraulic actuators 154 may be located on a single fuel flow loop 159, 160, using fuel taken from a single point along the main fuel flow path 110. The multiple actuators may be arranged in series with respect to fuel flow (such that all of the fuel in the offtake pipe 159 passes through all actuators, in turn) or in parallel with respect to fuel flow (with the offtake pipe 159 branching and one or more actuators on each branch).

Figure 7:
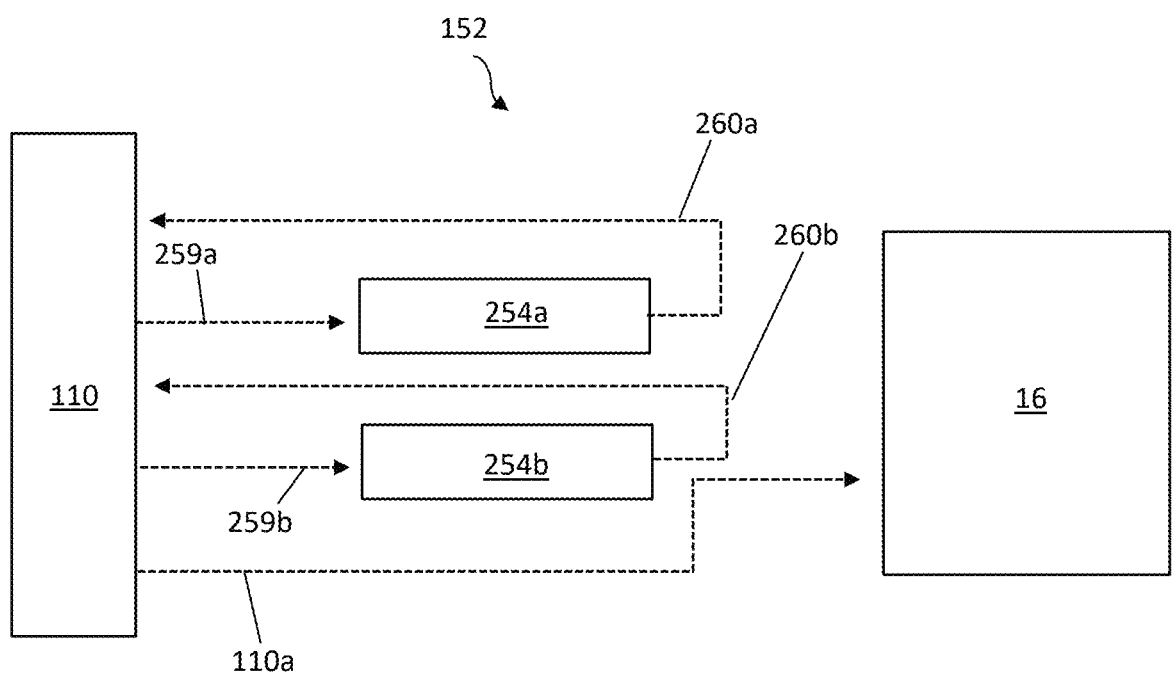
FIG. 7 is a schematic representing a portion of a fuel supply system comprising two fueldraulic actuators.

FIG. 7 shows a schematic diagram representing an alternative portion of a fuel supply system 152 of a gas turbine engine 10. The fuel supply system 152 comprises a fuel source 50, 53, which may be a single fuel tank or multiple fuel tanks, and a fuel flow path 110 between the fuel source 50,53 and the combustor 16. The fuel supply system 152 shown comprises two actuators 254a, b, each on a separate fuel offtake loop from the main fuel flow path 110. The dashed arrows in FIG. 7 represent the direction of fuel flow.

Both actuators 254a, b are fueldraulically driven. That is to say, both actuators are hydraulically actuated using fuel from the fuel source 50, 53 as the hydraulic liquid. Fuel travels from the main fuel flow path 110 to the actuators 254a, b respectively via lines 259a, b. After the fuel has been used to drive the actuators 254a, b, it returns to the main fuel flow pathway via lines 260a, b.

Only two actuators 254a, b are shown in FIG. 7 but, in other implementations, any plurality of actuators may be fueldraulically driven. In some implementation, the gas turbine engine 10 may comprise a plurality of fueldraulically driven actuators and a plurality of actuators which are not fueldraulically driven.

FIG. 7 shows a single fueldraulic actuator 254 on each fuel flow loop. In alternative implementations, multiple fueldraulic actuators 254 may be located on one or more of the multiple fuel flow loops. The multiple actuators may be arranged in series with respect to fuel flow (such that all of the fuel in the offtake pipe 159 passes through all actuators, in turn) or in parallel with respect to fuel flow (with the offtake pipe 159 branching and one or more actuators on each branch).

For some implementations comprising a plurality of fueldraulic actuators, all fuel used to fueldraulically drive the actuators may be taken from a single take-off point from the main fuel flow path (i.e., they may all be on a single fuel flow loop). In other implementations, one or more of the plurality of fueldraulic actuators may be supplied with fuel from different take-off points from the main fuel flow path (i.e., they may be on different fuel flow loops), but the fuel from each take-off point will be at the same pressure.

In various implementations, the gas turbine engine 10 comprises at least ten, eleven, twelve, thirteen, fourteen, fifteen, sixteen, seventeen, or eighteen fueldraulic actuators. In some implementations, each actuator may have its own dedicated fuel offtake pipe 159, 259 from the main fuel flow pathway 110, such that it has its own fuel flow loop. Two or more of these actuators may be located on the same fuel flow loop off the main fuel flow path 110 in other implementations.

In various implementations, the gas turbine engine 10 comprises one or more actuated engine systems. Each actuated engine system may comprise one or more individual actuators. An "actuated engine system" (also referred to as an "actuated system") refers to a group of actuators which are used in conjunction to control a specific system, or perform a particular function, within the engine 10.

For example, the actuated engine systems of an engine 10 may comprise one or more of:
An engine heat management system (HMS);
A generator HMS;
A Variable Stator Vane (VSV) system;
A cabin environmental control system (e.g. a cabin air conditioning system);
A de-icing system;
A turbine case cooling (TCC) system; and/or
A bearing chamber venting system.

Further, a given engine 10 may comprise multiple actuated systems of a given type, e.g., a plurality of de-icing systems each arranged to de-ice a different component, multiple bearing chamber venting systems for different bearing chambers, and/or a back-up cabin environmental control system.

Figure 8:
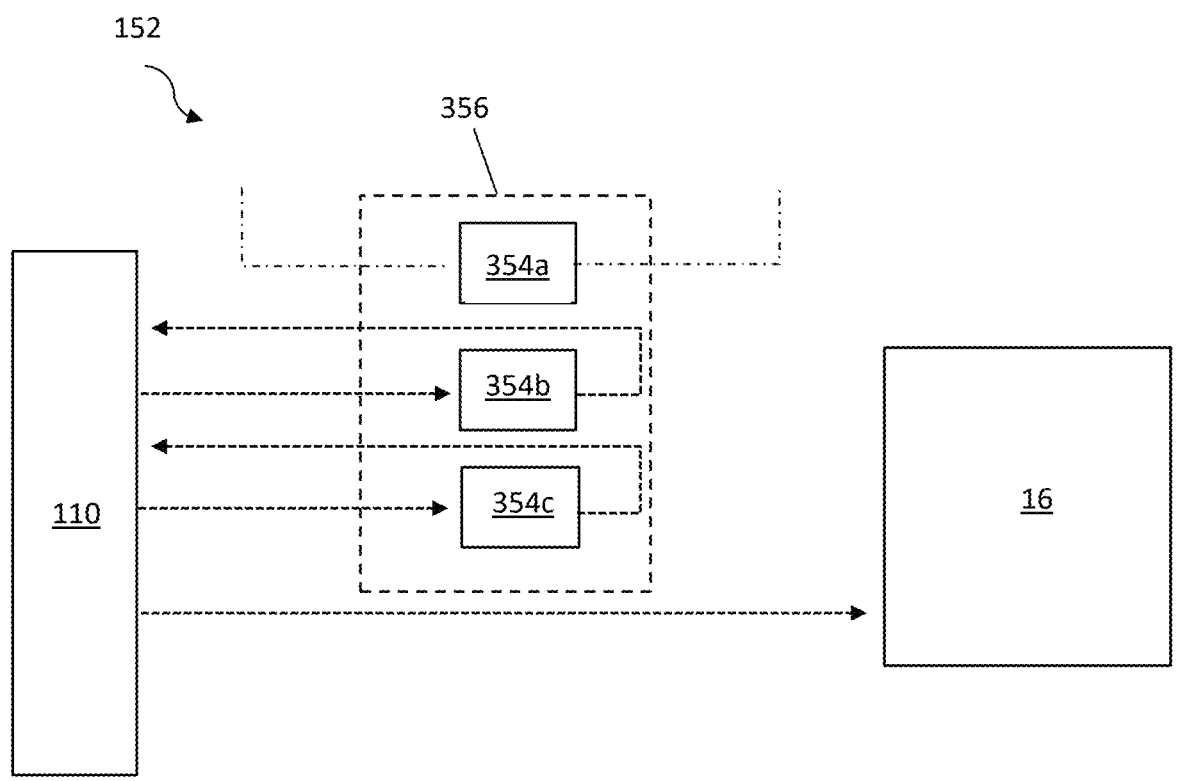
FIG. 8 is a schematic representing a portion of a fuel supply system comprising a fueldraulic actuation system.

FIG. 8 shows a schematic diagram representing a portion of a fuel supply system 152 of a gas turbine engine 10. The fuel supply system 152 comprises a main fuel flow pathway 110 from a fuel source 50, 53 to a combustor 16, and an actuated system 356. The dashed arrows in FIG. 8 represent the direction of fuel flow.

Similarly to FIGS. 6 and 7, fuel is supplied to the combustor 16, and fuel is supplied to the actuators 354*b*, 354*c* which are fueldraulic.

In the implementation of FIG. 8 the actuated system 356 comprises three actuators 354*a-c*. In other implementations, the actuated system 356 may comprise one actuator or any plurality of actuators.

In the implementation of FIG. 8, two actuators 354*b, c* are fueldraulically driven. Each fueldraulic actuator 354*b, c* of this implementation has its own dedicated fuel flow loop. Multiple actuators may be supplied with fuel taken from the same offtake point from the main fuel flow path 110 in other implementations.

The remaining actuator 354*a* is not fueldraulically driven and can instead be driven by any other suitable means (e.g., hydraulically driven using oil, or electronically actuated, or pneumatically actuated. The dot-dashed line indicates any actuation means; be that flow of a non-fuel liquid or electrical signals).

In some implementations, only one actuator within a given actuation system is fueldraulically driven. In other implementations, any plurality of actuators within a given actuation system are fueldraulically driven. All actuators within a given actuation system may be fueldraulically driven in some implementations. Any actuation system with at least one fueldraulic actuator can therefore be referred to as being "fueldraulic".

Figure 9:
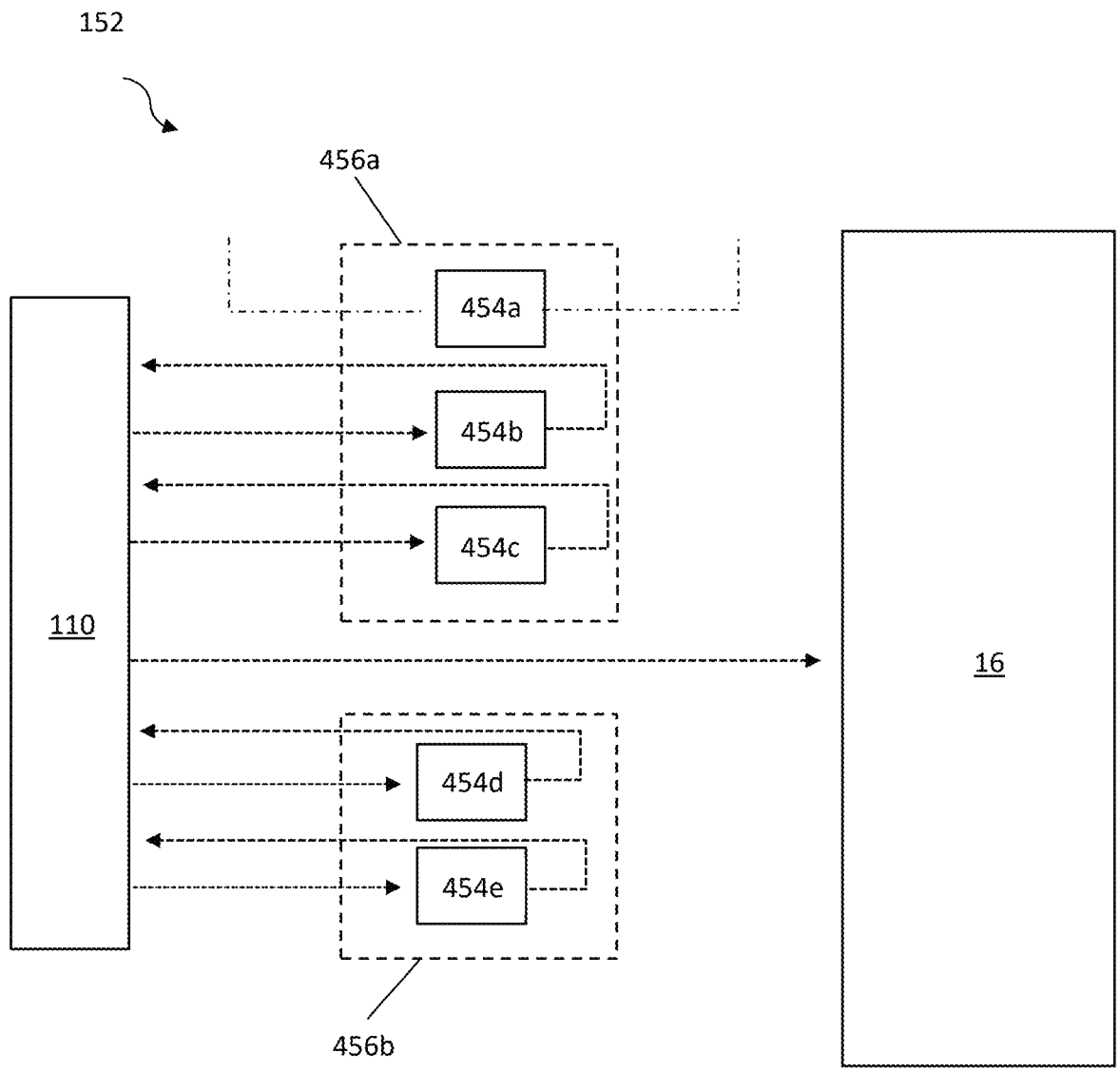
FIG. 9 is a schematic representing a portion of a fuel supply system comprising two fueldraulic actuation systems.

FIG. 9 shows a schematic diagram representing a portion of a fuel supply system 152 of a gas turbine engine 10. The fuel supply system 152 is generally as for that shown in FIG. 8, but comprises two actuated systems 456*a, b*. The dashed arrows in FIG. 9 again represent the direction of fuel flow.

The first actuated system 456*a* comprises three actuators 454*a-c*, two of which are fueldraulic. The second actuated system 456*b* comprises two actuators 454*d-e*, both of which are fueldraulic. This implementation is included for illustrative purposes only and the skilled person will recognise that the turbine engine 10 can comprise any number of actuated systems, and each actuated system can comprise any number of actuators. Any number of those actuators may be fueldraulically driven.

The actuators described above can be any actuator used by the engine 10. Various specific actuators which may be fueldraulically driven are described below. The actuation systems described herein can be any actuation system used by the aircraft. Various specific actuation systems which may be fueldraulically driven are described below. It will be appreciated that the specific implementations listed are described by way of example only, and that the scope of protection is limited only by the claims.

An example of an actuated system is a variable stator vane (VSV) system. A VSV system controls the amount of airflow through the compressor 14, 15 (by moving one or more vanes; and generally by moving multiple stages of compressor vanes) to provide optimum compressor performance. The VSV system varies the angle of the stator vanes of the compressor to manage compressor operability and efficiency.

In general, variable stator vanes are arranged to be rotatable about an axis to align with an angle of incoming airflow. This movement of the vanes allows a wider range of non-dimensional flow through the compressor 14, 15 without stall occurring; effectively the compressor 14, 15 can operate without surging over a wider range of engine power settings thanks to the VSVs. VSVs are controlled by the engine control system in response to a range of parameters, generally including ambient conditions and the level of thrust demanded from the engine.

In engines 10 with multiple compressors 14, 15, a VSV system may be provided for one, some, or all, compressors.

Many VSV systems comprise two VSV actuators, which are operable to change the angle of inlet guide vanes of the compressor 14, 15. Each of the two VSV actuators may be configured to control the guide vanes on a given side of the engine 10. In various implementations, one or more of the actuators of a VSV system are fueldraulically driven.

Figure 10:
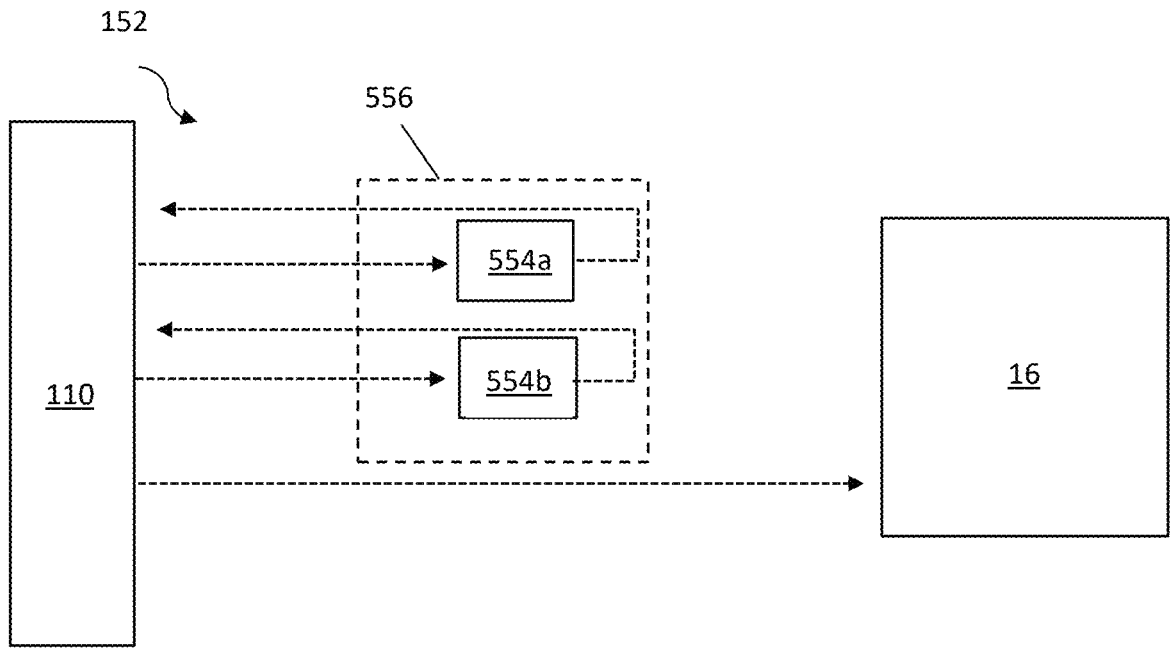
FIG. 10 is a schematic representing an example of a fueldraulic actuation system.

FIG. 10 shows a schematic of a fuel supply system 152 for an aircraft comprising a VSV system 556. The VSV system 565 comprises two actuators 554*a, b*. The fuel supply system 152 is arranged to supply fuel to the combustor 16 and to fueldraulically drive the actuators 554*a, b*.

Another example of an actuated system is a Turbine Case Cooling (TCC) system. Turbine engines 10 typically comprise a casing surrounding the turbine 17, 19 and a TCC system is used to selectively cool this casing. This cooling may be used to control rotor-stator tip clearances by reducing the amount of thermal expansion. A TCC system comprises one or more valves operable to modulate the flow of bleed air from the engine's compressor 17, 19 across the casing to provide cooling.

In engines 10 with multiple turbines 17, 19, a TCC system may be provided for one, some, or all, turbines.

The one or more valves of the TCC system are operable via an actuator. In various implementations, one or more of the actuators of a TCC system are fueldraulically driven.

Figure 11:
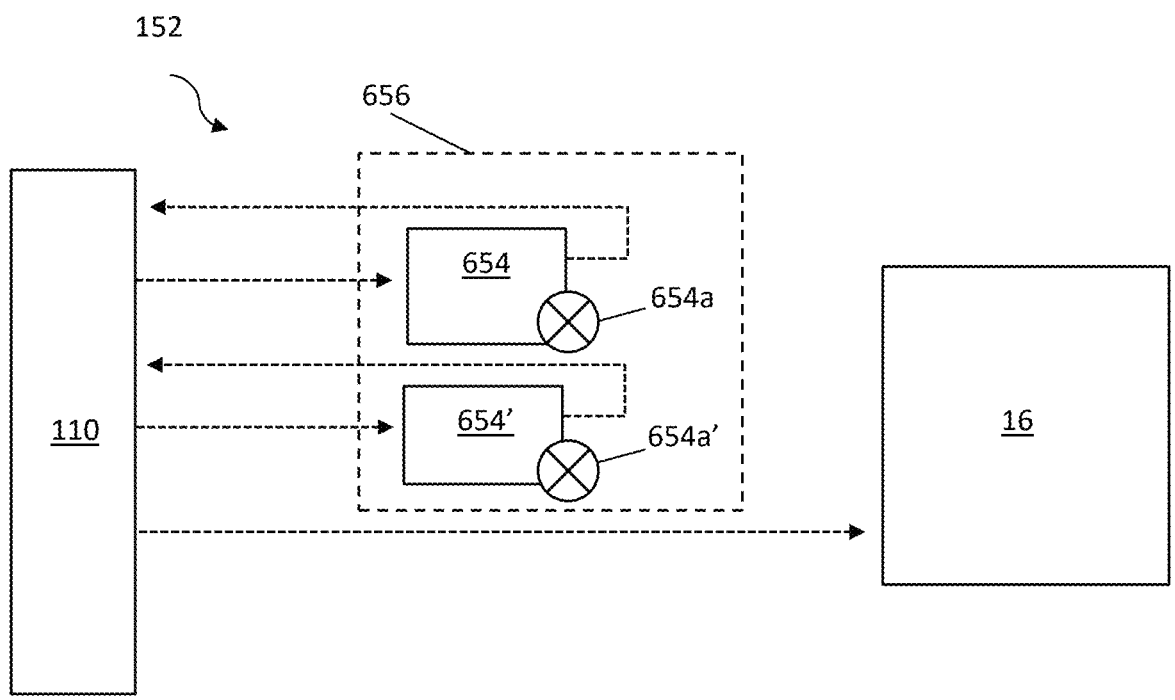
FIG. 11 is a schematic representing a further example of a fueldraulic actuation system.

FIG. 11 shows a schematic of a fuel supply system 152 for an aircraft 1 comprising a TCC system 656. The TCC system 656 comprises two actuators 654, 654', each actuator 654, 654' configured to control a corresponding valve 654a, 654a'. The fuel supply system 152 is arranged to supply fuel from the fuel source 50, 53 to the combustor 16 and to fueldraulically drive the actuators 654, 654'.

Another example of an actuated system used within turbine engines 10 is a hydro-mechanical unit (HMU). The HMU primarily distributes and regulates the flow of fuel to the combustor 16. It may also supply fuel to actuators.

The HMU comprises a plurality of actuators configured to operate a plurality of valves. In various implementations, one or more of these actuators are fueldraulically driven.

Hydro-mechanical units typically comprise 3 or 4 actuators. In various implementations, one, some, or all of these actuators can be fueldraulically driven.

The hydro-mechanical unit can comprise an actuator configured to regulate the fuel flow to the combustor 16 (e.g. it can be based on parameters including engine thrust demand and fuel calorific value) which includes controlling the spill of fuel around one or more engine fuel pumps (not all of the fuel leaving a pump is necessarily supplied to the combustor 16; some may instead be recirculated ("spilled"), and recirculated fuel generally forms a proportion of the fuel entering the pump inlet. Spilled fuel may therefore be used to perform engine functions as well as to allow a pump to keep operating at a set flow rate even when there are fluctuations in combustor fuel demand. As used herein, "spilled" fuel therefore includes fuel used for any purpose other than being fed to the combustor 16, e.g., for fueldraulics, not just fuel sent straight from the pump outlet to the pump inlet).

The hydro-mechanical unit can comprise an actuator configured to shut off the fuel supply. The hydro-mechanical unit can comprise an actuator configured to ensure a minimum fuel pressure or control a fuel pressure drop. The hydro-mechanical unit can comprise an actuator configured to control fuel supply through multiple pumps. The hydro-mechanical unit can comprise an actuator configured to open a path to a drain manifold when the engine is shutdown (e.g., for fuel return to tank procedures which may make use of a small, secondary fuel tank installed on the engine 10 rather than the main tank(s) 50, 53 of the aircraft). The hydro-mechanical unit can comprise an actuator associated with VSV control. The hydro-mechanical unit can comprise an actuator associated with thrust control accommodation. The hydro-mechanical unit can comprise an actuator configured to split fuel distribution (e.g. to distribute fuel to different manifolds for provision to injectors to the combustor 16, and/or for different fueldraulic controls). In some implementations, TCC control and/or variable bleed valve control may be performed using one or more actuators located within the HMU—there may therefore be some overlap of actuated systems.

In some implementations, the engine 10 may comprise a hydro-mechanical metering unit, which may be located along the main fuel flow path 110 through the engine, upstream of a fuel metering valve that controls fuel flow rate into the combustor 16. In some such implementations the, or each, fuel off-take point may be located adjacent to or within the hydro-mechanical metering unit.

Figure 12:
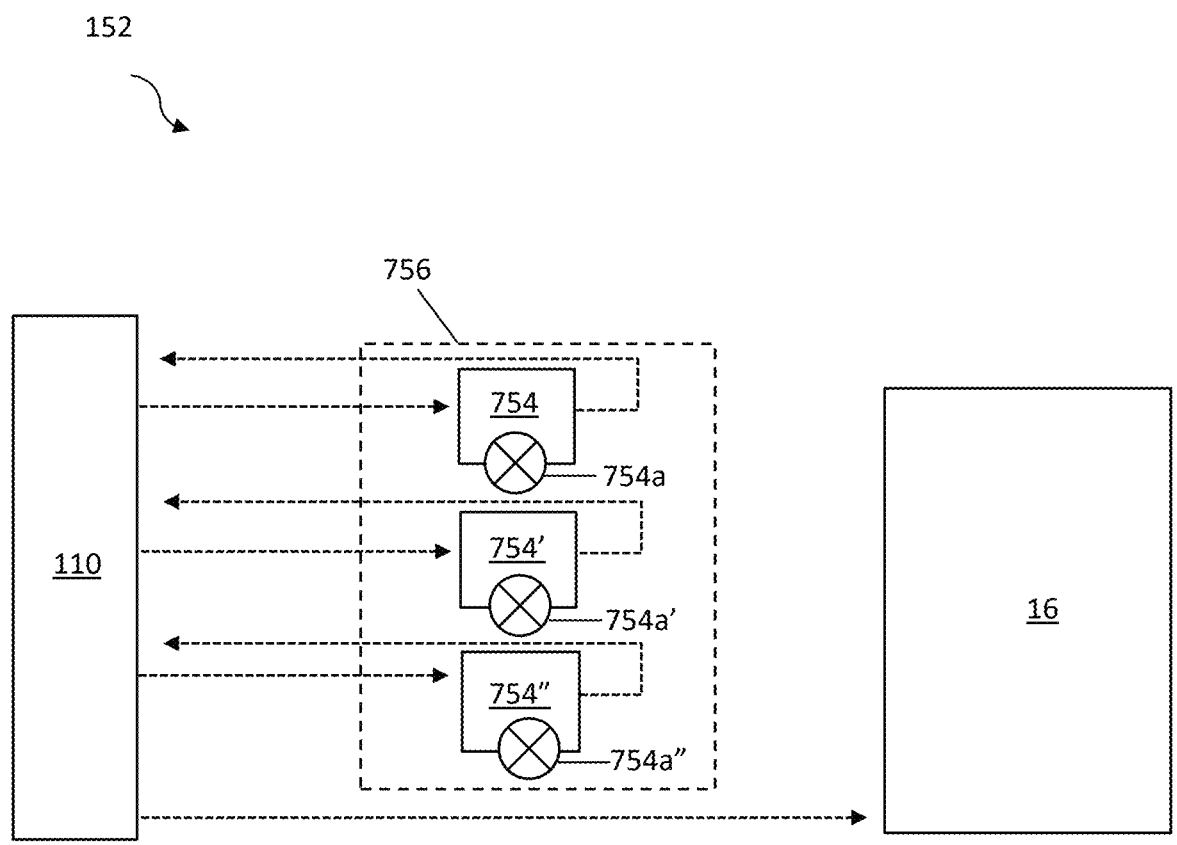
FIG. 12 is a schematic representing a further example of a fueldraulic actuation system.

FIG. 12 shows a schematic of a fuel supply system 152 for an aircraft 1 comprising a HMU 756. The HMU 756 shown comprises three actuators 754, 754', 754". The fuel supply system 152 is arranged to supply fuel from the fuel source 50, 53 to the combustor 16 and to fueldraulically drive the actuators 754. Each actuator 754 is configured to control an associated valve 754a, 754a', 754a". FIG. 12 shows each actuator 754 with its own dedicated off-take point from the main fuel flow path 110, and its own dedicated fuel loop. In other implementations, a branching pathway and/or distribution manifold may be provided to split fuel from a single off-take point from the main fuel flow path 110 between multiple fueldraulic actuators. A hydro-mechanical metering unit, where present, may be provided as part of the HMU.

Another example of an actuator used within turbine engines 10 is a ventilation valve actuator (also referred to herein as a "vent valve actuator"). Vent valve actuators control the opening and closing of ventilation valves, which control the opening and closing of ventilation lines for one or more engine bearing chambers.

Various implementations can comprise one or more ventilation valves controlled by one or more ventilation valve actuators. In some implementations, one or more of these ventilation valve actuators are fueldraulically driven.

Figure 13:
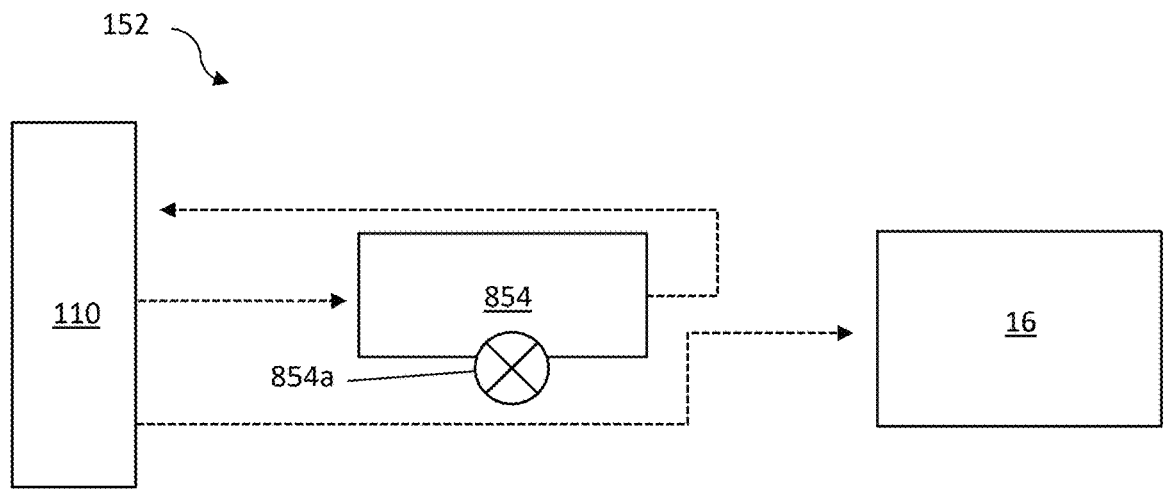
FIG. 13 is a schematic representing a further example of a fueldraulically driven actuator.

FIG. 13 shows a schematic of a fuel supply system 152 for an aircraft 1 comprising a ventilation valve 854a. The ventilation valve 854a is controlled via an actuator 854. The fuel supply system 152 is arranged to provide fuel from a fuel source 50, 53 to fueldraulically actuate the actuator 854 and to provide fuel to the combustor 16. The actuated opening and closing of the ventilation valve 854a controls air flow between the engine bearing chamber and the atmosphere. A ventilation valve system may be defined, comprising at least the ventilation valve 854a and its actuator 854, and optionally comprising multiple valves and/or actuators.

Another example of an actuated system used within turbine engines 10 is a bleed air system. Bleed air systems 954, 954a, 1054, 1054a, 1154, 1154a, each comprising at least a valve and its associated actuator, redirect bleed air (compressed air taken from the compressor 14, 15 upstream of the combustor 16) for use in other systems. Bleed air is useful in various systems because of its relatively high temperature and pressure. Bleed air systems may be referred to as "engine bleed air systems" (EBAS).

There are many bleed air systems which can be used within a turbine engine 10, some of which are described below. Bleed air systems comprise one or more valves controlled by one or more actuators. In various implementations, one or more of the actuators within a bleed air system are fueldraulically driven.

Bleed air systems which are used to control the pressure within the cabin of the aircraft 1 are referred to as environmental bleed air systems.

Bleed air systems can be used to remove or prevent the formation of ice on the nacelle 21 by redirecting air at high pressure and temperature from the compressor 14, 15 onto the nacelle 21. Such systems comprise a nacelle anti-icing valve 954a which is controlled by an actuator 954. In various implementations, this actuator is fueldraulically driven.

Figure 14:
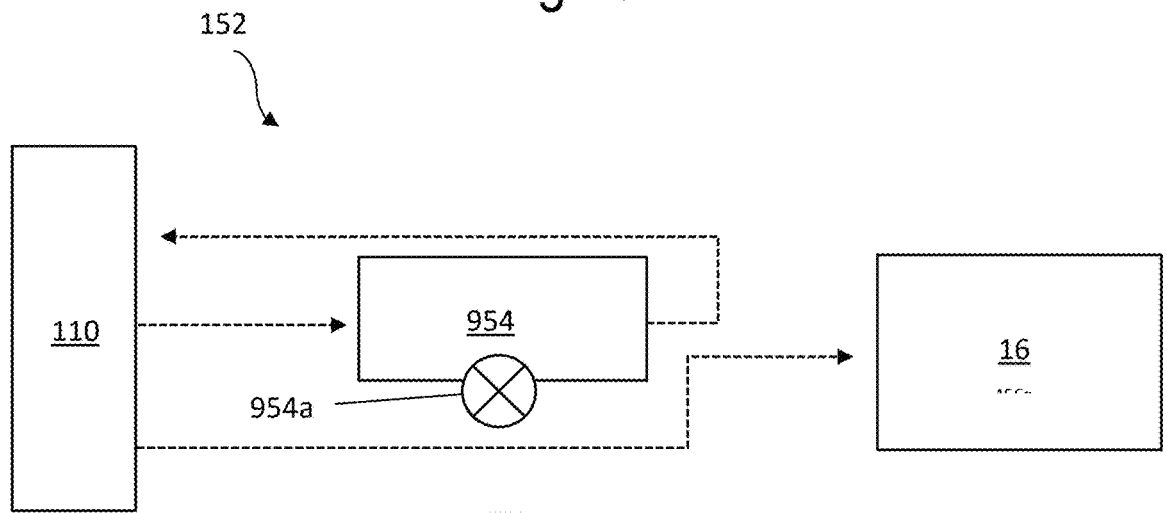
FIG. 14 is a schematic representing a further example of a fueldraulically driven actuator.

FIG. 14 shows a schematic of a fuel supply system 152 comprising a fuel source 50, 53 (grouped within fuel flow path 110 for clarity) and a combustor 16. The fuel supply system 152 is arranged to supply fuel to the combustor 16 and to the supply fuel to an actuator 954 so as to fueldraulically drive the actuator 954. The actuator 954 is configured to operate a valve 954a which enables the passage of bleed air over the nacelle 21 of a gas turbine engine 10.

Bleed air systems can also be used to remove or prevent the formation of ice on the engine stators by redirecting air at high pressure and temperature from the compressor 14, 15 onto the engine stators. Such systems may comprise an engine section stator (ESS) anti-icing valve which is controlled by an actuator. In various implementations, this actuator is fueldraulically driven.

Figure 15:
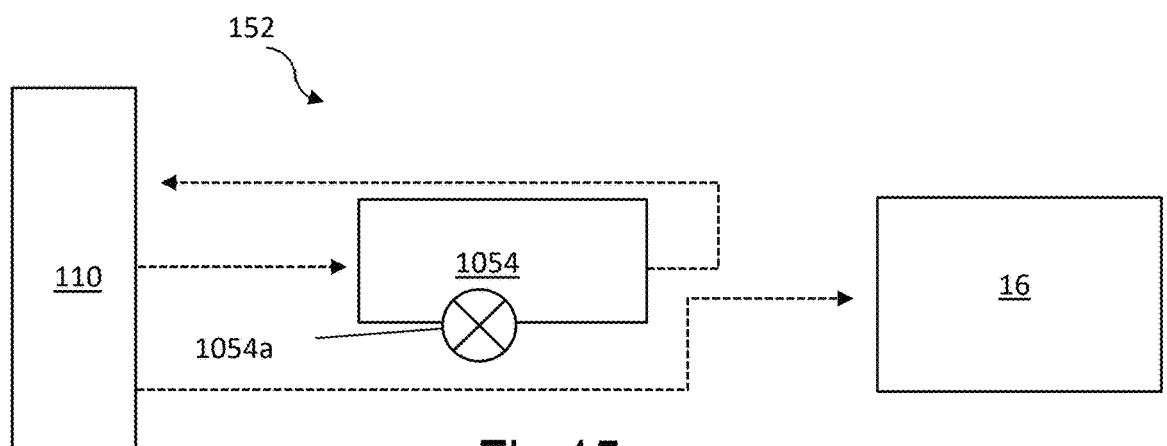
FIG. 15 is a schematic representing a further example of a fueldraulically driven actuator.

FIG. 15 shows a schematic of a fuel supply system 152 comprising a fuel source 50, 53 and a combustor 16. The fuel supply system 152 is arranged to supply fuel to the combustor 16 and to supply fuel to a bleed air actuator 1054 so as to fueldraulically drive the actuator 1054. The actuator 1054 is configured to operate a valve 1054a which enables the passage of bleed air over/onto one or more stators of a turbine engine 10—the valve 1054a may be an ESS anti-icing valve.

Bleed air systems can also be used to control the air conditioning within the cabin of an aircraft 1. In such systems, bleed air is filtered and cooled (via expansion and/or heat exchange e.g., with atmospheric air) using a conditioning pack (conditioning packs or Pressurization Air conditioning Kits (PACKS) are both accepted terms). Air conditioning packs are used to cool and, if appropriate, dehumidify the bleed air from the engine or APU before it is supplied to the aircraft cabin. Such systems comprise one or more valves and one or more actuators. The air from the engine 10 is generally fed to the pack via a one-way check valve 1154a. In various implementations, one or more of these actuators are fueldraulically driven.

Figure 16:
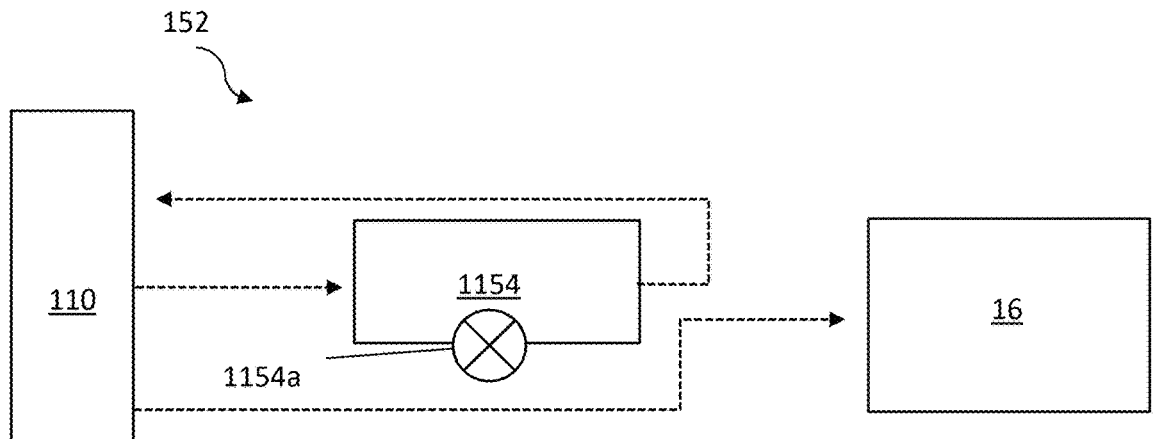
FIG. 16 is a schematic representing a further example of a fueldraulically driven actuator.

FIG. 16 shows a schematic of a fuel supply system 152 arranged to supply fuel to the combustor 16 and to supply fuel to a conditioning pack actuator 1154 so as to fueldraulically drive the actuator 1154. The actuator 1154 is configured to operate a valve 1154a which enables the passage of bleed air into a conditioning pack. The valve 1154a may therefore be referred to as an environmental bleed air valve; a conditioning pack valve being one example of such.

The extraction of bleed air from the compressor for air conditioning, prior to its use in other systems, typically takes place through a high stage valve (otherwise known as a "high pressure valve") which is controlled by an actuator. In various implementations, this actuator is fueldraulically driven. Bleed air extracted from the compressor 14, 15 via the high stage valve is subsequently redirected via one or more additional valves for use in environmental control of the aircraft cabin.

Figure 17:
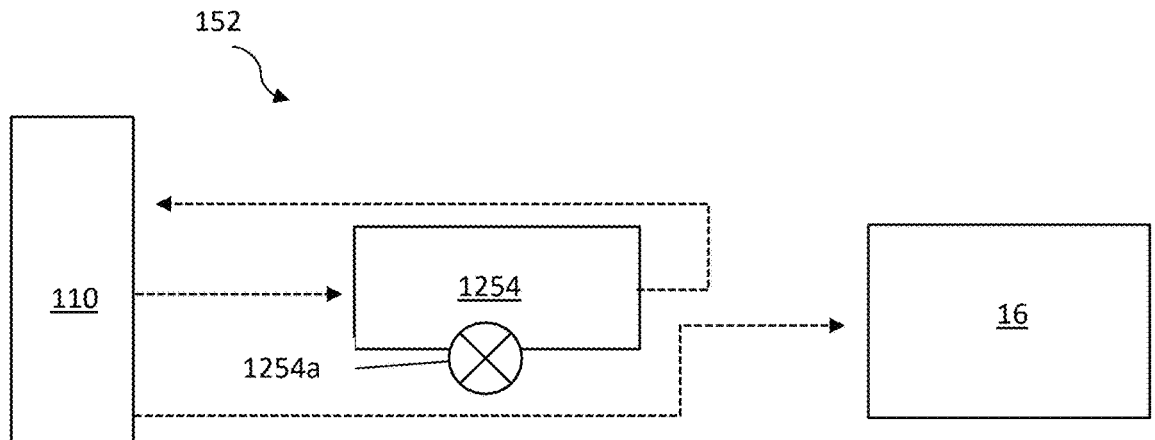
FIG. 17 is a schematic representing a further example of a fueldraulically driven actuator.

FIG. 17 shows a schematic of a fuel supply system 152 arranged to supply fuel to the combustor 16 and to a high stage valve actuator 1254 so as to fueldraulically drive the actuator 1254. The actuator 1254 is configured to operate a high stage valve 1254a which enables the extraction of bleed air from the compressor 14, 15 for subsequent use.

Bleed air can be extracted from other parts of the engine 10 and/or other parts of the aircraft 1, in addition to, or instead of, the compressor 14, 15—for example, bleed air may be taken from a bypass duct 22 or APU. The extraction of this bleed air is via an engine bleed air valve (also known as a "manifold pressure valve" or a pressure regulation valve) which is controlled by an actuator. In various implementations, this actuator is fueldraulically driven.

Bleed air can typically be taken from three sources: an intermediate pressure bleed (IP compressor 14), a high-pressure bleed (HP compressor 15), or a bypass duct 22 (i.e., downstream of the fan 23).

Each bleed air source can have an associated valve. In addition, there is typically a valve which regulates the static pressure (downstream of the IP and HP sources) conforming to the end user requirements of the aircraft systems. Any of these valves may be fueldraulically actuated.

The manifold pressure valve is used to regulate the pressure of the bleed air as appropriate for its desired use(s).

Figure 18:
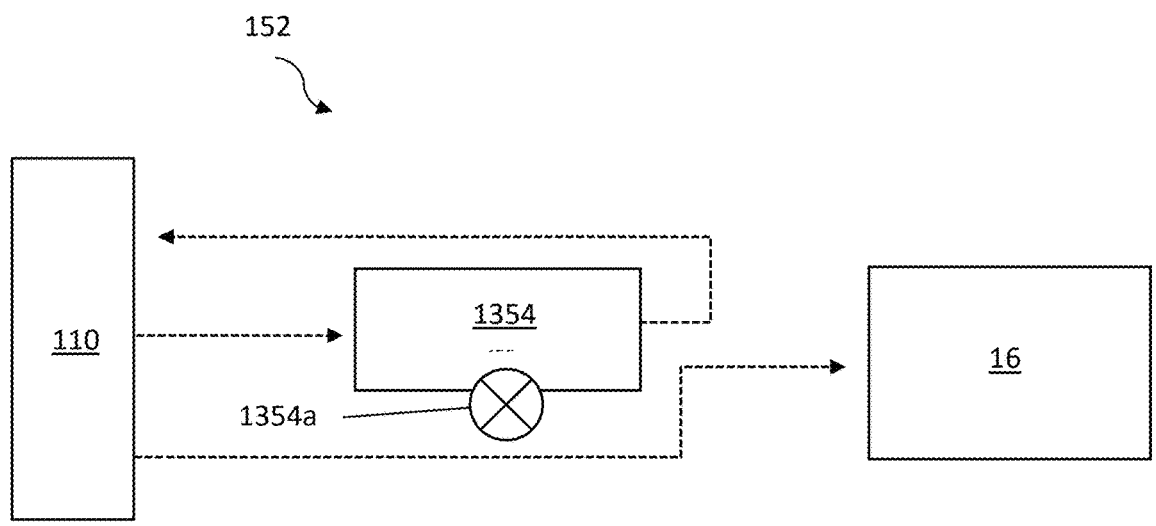
FIG. 18 is a schematic representing a further example of a fueldraulically driven actuator.

FIG. 18 shows a schematic of a fuel supply system 152 arranged to supply fuel to the combustor 16 and to an actuator 1354 so as to fueldraulically drive the actuator 1354. The actuator 1354 is configured to operate a valve 1354a which enables the extraction of bleed air from parts of the engine other than the compressor, e.g., from a bypass duct 22.

Bleed air can be extracted from an auxiliary power unit (APU) 1455; the APU may be located within the engine 10 in some implementations, or elsewhere within the aircraft in other implementations. Extraction of bleed air from the APU is typically via an APU bleed air valve which is controlled by an actuator. In various implementations, this actuator is fueldraulically driven. The dot-dashed arrow in FIG. 19 represents a flow of bleed air from the APU 1454' to an APU bleed air valve 1454a.

In some implementations, fuel used to drive the APU bleed valve may be taken from a feed line between the fuel source and the engine, whereas fuel for other fueldraulic actuators may be taken from feed lines within the engine. The APU bleed valve 1454a, and indeed the APU 1454', may therefore not be a part of the engine 10 in some implementations.

Figure 19:
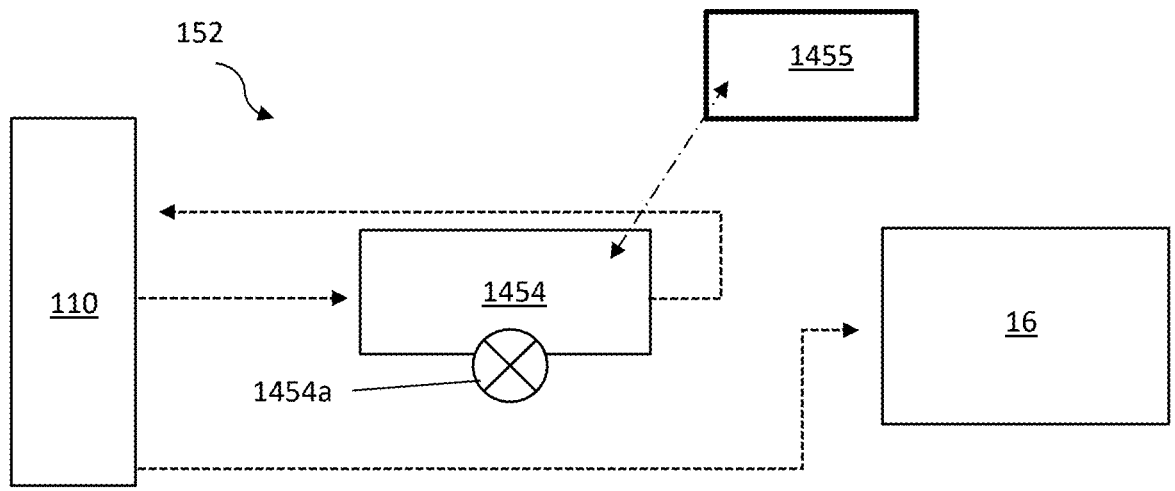
FIG. 19 is a schematic representing a further example of a fueldraulically driven actuator.

FIG. 19 shows a schematic of a fuel supply system 152 arranged to supply fuel to the combustor 16 and to an APU bleed air actuator 1454 so as to fueldraulically drive the actuator 1454. The actuator 1454 is configured to operate a valve 1454a which enables the extraction of bleed air from an auxiliary power unit.

Bleed air from the APU 1455 can be used to assist with various tasks, such as starting the engine 10. An engine start valve controls the flow of bleed air from the APU 1455 to the turbine 17, 19. The engine start valve is controlled by an actuator. In various implementations, this actuator is fueldraulically driven.

Figure 20:
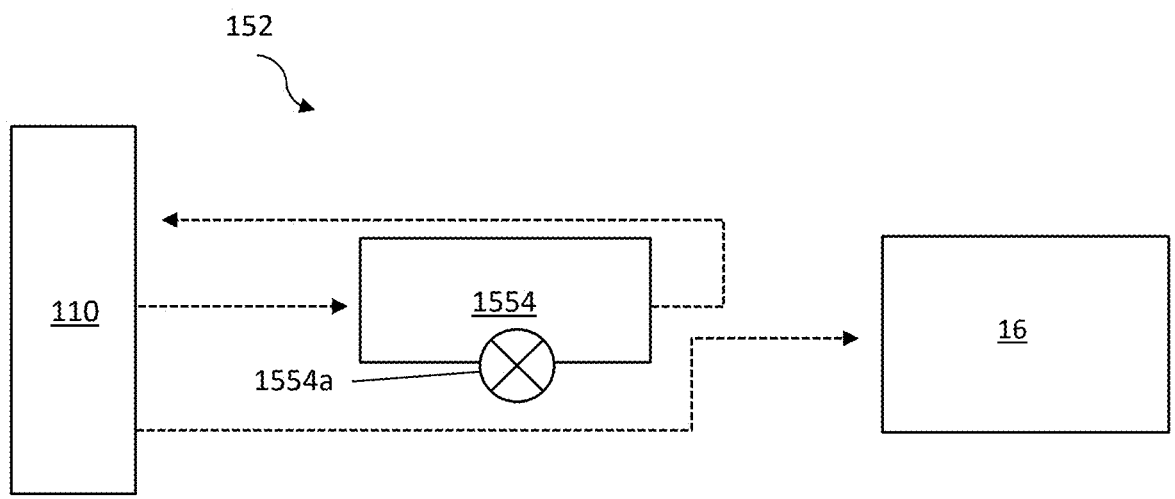
FIG. 20 is a schematic representing a further example of a fueldraulically driven actuator.

FIG. 20 shows a schematic of a fuel supply system 152 arranged to supply fuel to the combustor 16 and to an engine start valve actuator 1554 so as to fueldraulically drive the actuator 1554. The actuator 1554 is configured to operate an engine starter valve 1554a which redirects bleed air from the auxiliary power unit for use in starting the turbine engine 10.

Bleed air taken from one turbine engine 10 can be fed into components of another turbine engine, for aircraft with multiple engines 10 (e.g., on the opposite wing of an aircraft 1). The flow of bleed air between engines 10 is regulated by an isolation valve 1654a. The isolation valve is controlled by an actuator 1654. In various implementations, this actuator is fueldraulically driven.

Figure 21:
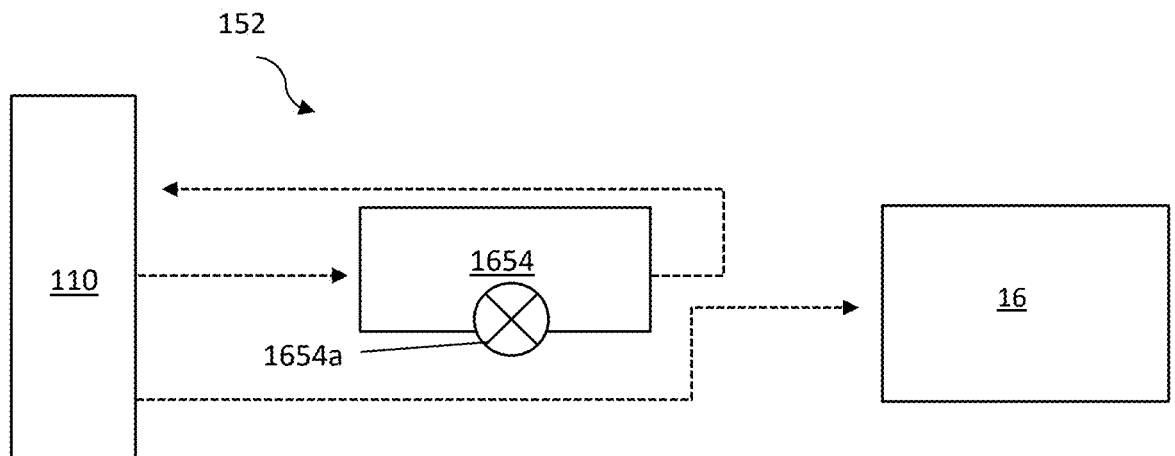
FIG. 21 is a schematic representing a further example of a fueldraulically driven actuator.

FIG. 21 shows a schematic of a fuel supply system 152 arranged to supply fuel to the combustor 16 and to an isolation valve actuator 1654 so as to fueldraulically drive the actuator 1654. The actuator 1654 is configured to operate an isolation valve 1654a.

Another example of an actuated system used within turbine engines 10 is a heat management system (HMS). Turbine engines 10 often comprise an engine HMS and a generator HMS. Both HMS systems control the temperature of oil by enabling and controlling the use (or bypass) of air-oil (and/or fuel-oil) heat exchangers.

The engine HMS system controls the temperature of the oil system that lubricates components of the engine (e.g., bearing chambers, gearbox, etc). The engine HMS system comprises one or more engine HMS valves which are controlled by one or more actuators. In various implementations, one or more of these actuators are fueldraulically driven.

For example, in some implementations, the engine HMS comprises a single valve and a single actuator which is fueldraulically driven and arranged to control the valve.

Figure 36:
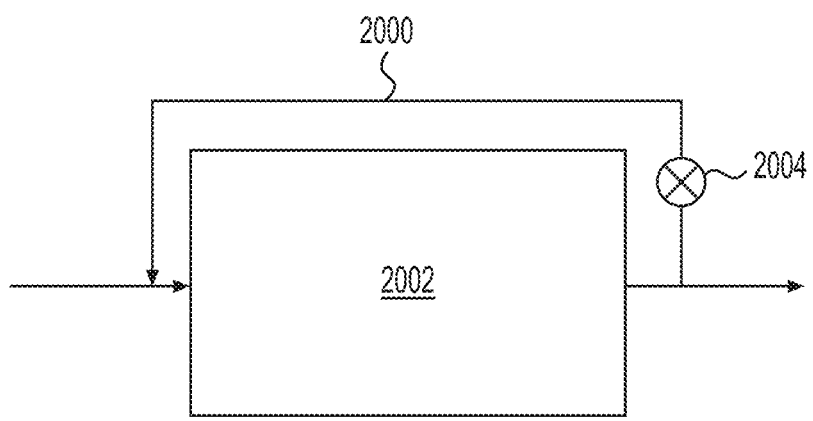
FIG. 36 is schematic representation of a heat exchanger and recirculation pipe.

The engine HMS system may comprise a plurality of heat exchangers arranged in a parallel configuration or series configuration. A single valve controlled by a single fueldraulic actuator may enable the use (or bypass) of all of the heat exchangers—in particular, flow rate of a fluid (air, oil, or fuel, as applicable) may be controlled by the valve, with the proportion of fluid not going through the heat exchanger being directed along a bypass pipe. In some implementations, each heat exchanger has an associated valve controlled by an associated actuator. In various implementations, one or more of these actuators are fueldraulically driven. In addition, as illustrated in FIG. 36, one or more recirculation pipes 2000 may be provided to allow fluid from a heat exchanger 2002 outlet to be returned to the heat exchanger inlet, so passing through the heat exchanger multiple times. Flow through the recirculation pipe(s) may again be adjusted using an actuator-controlled valve 2004. In some implementations, a pump, or other means for conveying fuel, may be present within, or associated with, the recirculation pipe(s) to drive this recirculation.

Figure 22:
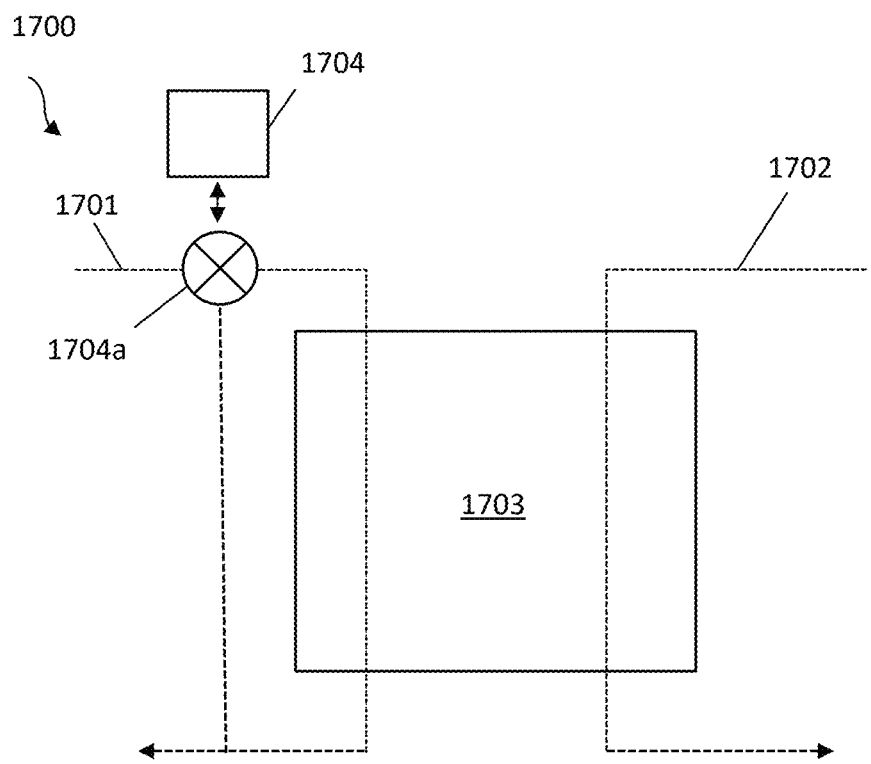
FIG. 22 is a schematic representing an engine heat management system comprising an oil-side valve operable using a fueldraulic actuator.

FIG. 22 shows a schematic view of a section of an engine HMS 1700. The engine HMS comprises an oil-air heat exchanger 1703 configured to transfer heat away from oil within the engine. The engine HMS 1700 comprises an oil-line 1701 and an air-line 1702.

The engine HMS 1700 comprises a valve 1704a positioned within the oil-line 1701. The valve 1704a is configured to direct oil through the heat exchanger 1703 or to direct oil to bypass the heat exchanger 1703. The valve 1704a is controlled via an actuator 1704 which is fueldraulically driven.

The actuator 1704 is configured to actuate the valve 1704a so as to enable non-binary position adjustment between an open valve position and a closed valve position (i.e., the actuator 1704 can enable analogue rather than binary control of the valve 1704a, or it may enable the valve to be adjusted to one or more intermediate positions between open and closed). The valve 1704a and associated fueldraulic actuator 1704 are therefore configured to control the amount of oil passing through the heat exchanger 1703 so as to regulate the cooling of the oil.

Figure 23:
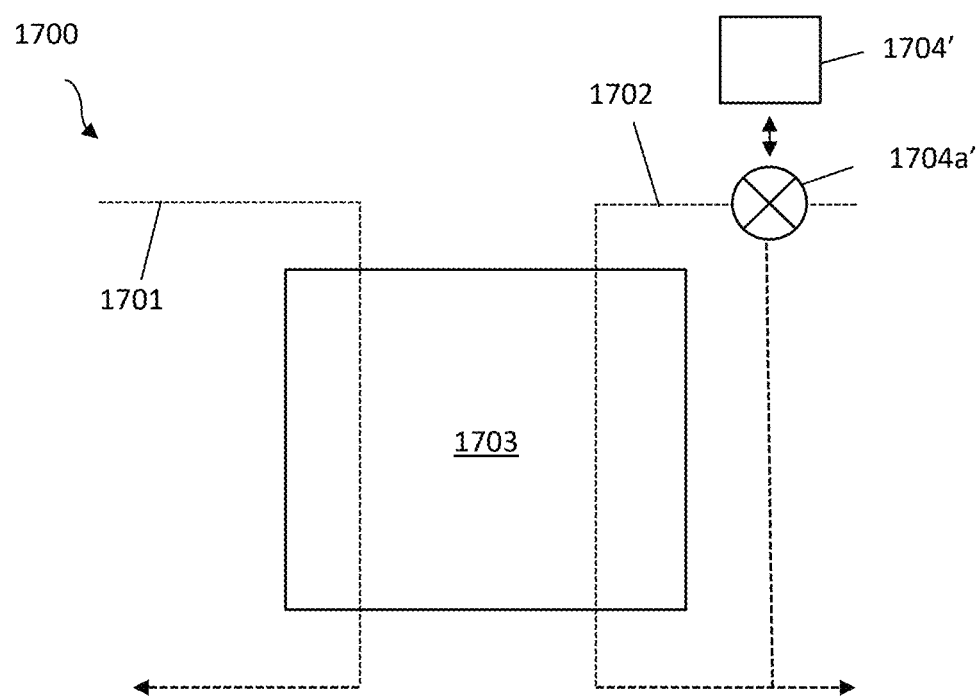
FIG. 23 is a schematic representing an engine heat management system comprising an air-side valve operable using a fueldraulic actuator.

FIG. 23 shows a schematic view of a section of an engine HMS 1700 according to an alternative implementation. The engine HMS 1700 comprises an oil-air heat exchanger 1703 configured to transfer heat away from oil within the engine. The engine HMS 1700 comprises an oil-line 1701 and an air-line 1702, as for the implementation described with respect to FIG. 22. The fueldraulically-controlled valve 1704a' is, however, differently located.

The engine HMS 1700 of FIG. 23 comprises a valve 1704a' positioned within the air-line 1702. The valve 1704a' is configured to direct air through the heat exchanger 1703 or to direct air to bypass the heat exchanger 1703. The valve 1704a' is controlled via an actuator 1704' which is fueldraulically driven.

The actuator 1704' is again configured to actuate the valve 1704a' so as to enable non-binary position adjustment between an open valve position and a closed valve position (i.e., the actuator 1704' can enable analogue rather than binary control of the valve 1704a', or it may enable the valve to be adjusted to one or more intermediate positions between open and closed). The valve 1704a' and associated fueldraulic actuator 1704' are therefore configured to control the amount of air passing through the heat exchanger 1803 so as to regulate the cooling of the oil.

In alternative implementations, the engine HMS of FIGS. 22 and 23 can be combined such that the HMS comprises a valve 1704a, 1704a' actuated via fueldraulic actuators 1704, 1704' in both the air-line and the oil-line.

In FIGS. 22 and 23 the heat exchanger 1703 is a parallel flow heat exchanger. In other implementations, the heat exchanger 1703 can be a counter-flow heat exchanger, meaning the direction of flow of either the air-line or oil-line is reversed.

Figure 24:
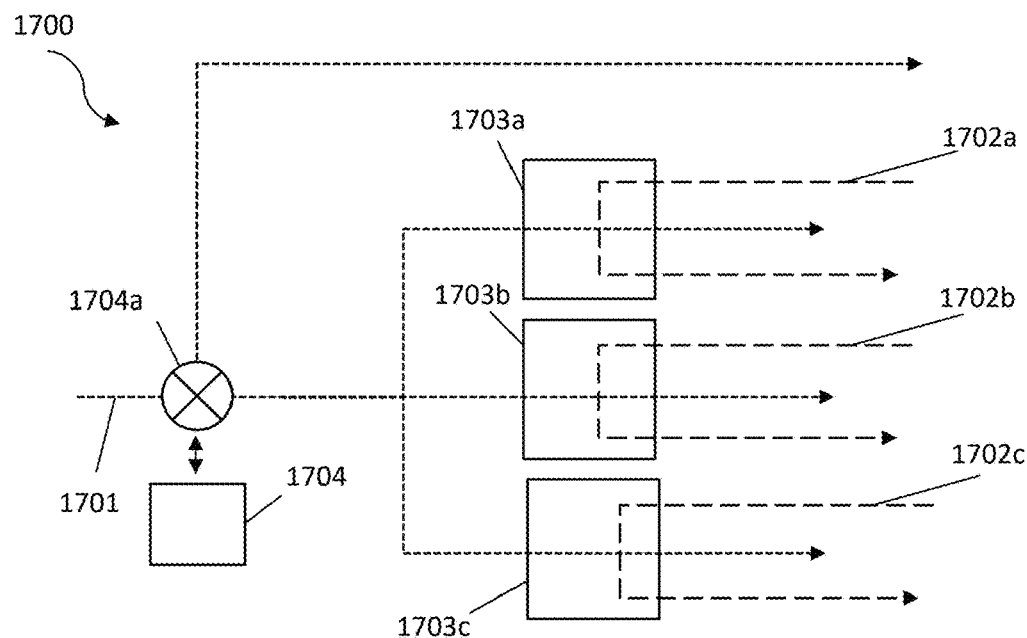
FIG. 24 is a schematic representing an engine heat management system comprising a plurality of heat exchangers.

FIG. 24 shows another implementation wherein the engine HMS 1700 comprises three heat exchangers 1703a-c arranged in parallel with respect to oil flow (being located on branches of the oil line 1701). Although the implementation of FIG. 24 comprises three heat exchangers, in other implementations any plurality of heat exchangers may be used. All three heat exchangers 1703a-c are air-oil heat exchangers in the implementation shown.

The engine HMS 1700 comprises an oil-line 1701 which feeds oil into the heat exchangers 1703a-c. The engine HMS 1700 comprises three air-lines 1702a-c which respectively feed air into the heat exchangers 1703a-c.

The engine HMS 1700 comprises a valve 1704a in the oil-line 1701 which is configured to enable oil to travel through, or bypass, all of the heat exchangers 1703a-c. The valve 1704a is controlled via an actuator 1704 which is fueldraulically driven.

The actuator 1704 is configured to actuate the valve 1704a so as to enable non-binary position adjustment between an open valve position and a closed valve position (i.e., the valve may be continually adjustable, or adjustable between three or more positions). The valve 1704a and associated fueldraulic actuator 1704 are therefore configured to control the amount of oil passing through the heat exchangers 1703a-c so as to regulate the cooling of the oil.

In other implementations, the engine HMS 1700 comprises additional valves, each valve being disposed within an air-line 1702a-c and being configured to enable air to bypass the corresponding air-oil heat exchanger 1703a-c. One or more of the valves disposed within the air-lines 1902a-c can be fueldraulically driven.

Figure 25:
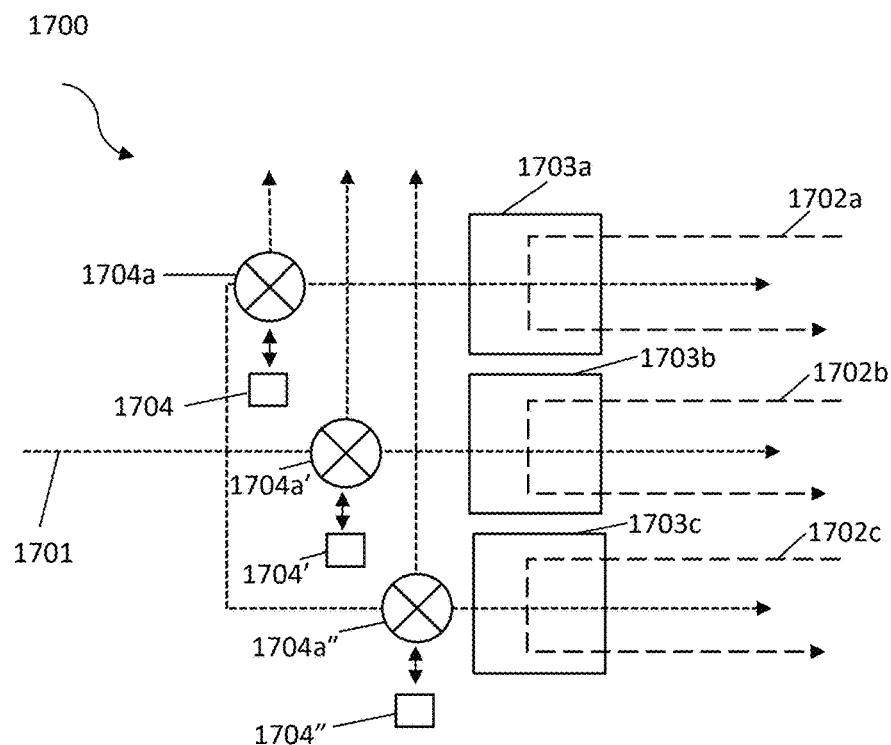
FIG. 25 is a schematic representing an alternative engine heat management system comprising a plurality of heat exchangers.

FIG. 25 shows an alternative implementation wherein the engine HMS 1700 again comprises three heat exchangers 1703a-c arranged in parallel, but in which the valve arrangement is different from that of FIG. 24. Although the implementation of FIG. 25 comprises three heat exchangers, in other implementations any plurality of heat exchangers may be used.

The engine HMS 1700 comprises an oil-line 1701 which feeds oil into the heat exchangers 1703a-c. The engine HMS 1700 comprises three air-lines 1702a-c which respectively feed air into the heat exchangers 1703a-c The engine HMS 1700 comprises three valve 1704a, 1704a', 1704a'' (collectively, 1704a), each valve 1704a being positioned in the oil-line 1701, each on a different branch thereof. Each valve 1704a is configured to enable oil to travel through, or bypass, an associated heat exchanger 1703a-c. The valves 1704a enable oil to bypass one or more of the heat exchangers 1703a-c so as to control the rate and amount of heat transfer away from the oil. Each of the valves

1704a is controlled via a respective actuator 1704, 1704', 1704" (collectively, 1704). One or more of the actuators 1704 can be fueldraulically driven.

The actuators 1704 are configured to actuate the valves 1704a so as to enable non-binary position adjustment between an open valve position and a closed valve position for each valve 1704a (i.e., the valve may be continually adjustable, or adjustable between three or more positions). The valves 1704a and associated fueldraulic actuators 1704 are therefore configured to individually control the amount of oil passing through each of the heat exchangers 1703a-c so as to regulate the cooling of the oil.

In other implementations, the engine HMS 1700 comprises additional valves, each valve being disposed within an air-line 1702a-c and being configured to enable air to bypass the corresponding air-oil heat exchanger 1703a-c. One or more of the valves disposed within the air-lines 1702a-c can be fueldraulically driven.

In other implementations, the engine HMS systems 1700 of FIGS. 24 and 25 can be combined such that the HMS system comprises a valve to enable the simultaneous bypass of all heat exchangers as well as valves for the bypass of individual heat exchangers.

Figure 26:
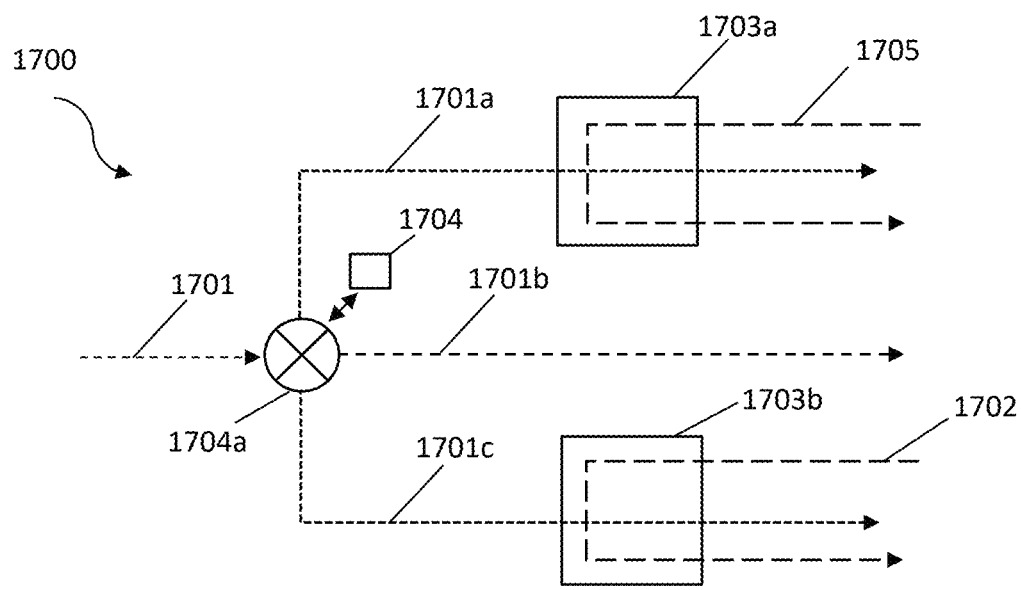
FIG. 26 is a schematic representing a further alternative engine heat management system comprising an air-oil heat exchanger and a fuel-oil heat exchanger.

FIG. 26 shows a schematic view of an engine HMS 1700 comprising a fuel-oil heat exchanger 1703a and an air-oil heat exchanger 1703b. The engine HMS 1700 comprises an oil-line 1701 comprising a valve 1704a. The valve 1704a can be operated via a fueldraulically driven actuator 1704. The valve 1704a splits the oil-line 1701 into three parts, or branches, and regulates the flow of oil into each part.

The first part 1701a of the oil-line passes through the fuel-oil heat exchanger 1703a. Fuel passes through the fuel-oil heat exchanger 1703a via fuel-line 1705. The fuel in the fuel line 1705 that passes through the fuel-oil heat exchanger 1703a can be used the fueldraulically drive the actuator 1704 to control the valve 1704a. The fuel may be used to fueldraulically drive the actuator 1704 to control the valve 1704a after the fuel has passed through the heat exchanger 1703a, or before the fuel passes through the heat exchanger 1703a.

The second part of the oil-line 1701b does not pass through either of the heat exchangers 1703a,b.

The third part of the oil-line 1701c passes through the air-oil heat exchanger 1703b. Air passes through the air-oil heat exchanger 1703b via air-line 1702.

The engine HMS 1700 of FIG. 26 may comprise one or more additional valves in the oil-line 1701c and/or the oil-line 1701a. These valves may be fueldraulically driven. The valves may enable oil to bypass the associated heat exchangers. In such implementations, the oil-line 1701b may be omitted. In other implementations, one or more additional valves may be included in the air-line 1702 and/or the fuel-line 1705 to enable air or fuel (as applicable) to bypass the respective heat exchanger 1703 a, b.

Figure 27:
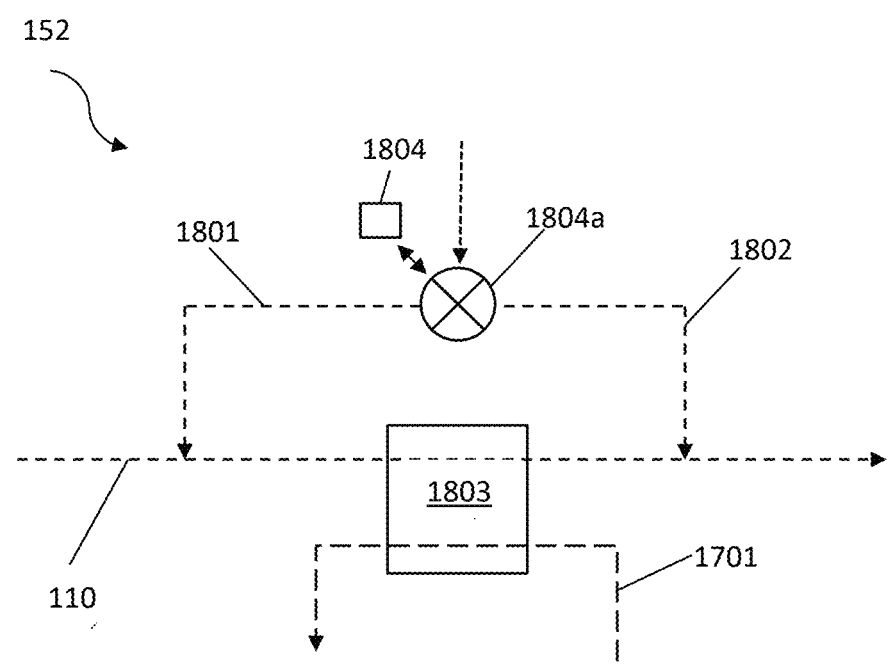
FIG. 27 is a schematic representing an example of a portion of a fuel supply system with a valve operable using a fueldraulic actuator.

FIG. 27 shows a schematic view of a section of a fuel-supply system 152. The fuel supply system 152 comprises a valve 1804a configured to split fuel into two paths. The valve 1804a can be operated using a fueldraulically driven actuator 1804. The first path 1801 diverts the fuel upstream of a fuel-oil heat exchanger 1803 such that the fuel travels through the fuel-oil heat exchanger 1803 on the way to the combustor 16. The second path 1802 diverts the fuel downstream of the fuel-oil heat exchanger 1803 such that the fuel is not heated on its way to the combustor 16. This section of the fuel supply system 152 may be used to return fuel to the main fuel flow path 110. The valve 1804a may be used to decide where along the fuel flow path to divert how much of the fuel. The fuel-oil heat exchanger 1803 may be the fuel-oil heat exchanger 1703a of the implementation of FIG. 26, or a different fuel-oil heat exchanger.

It will be appreciated that fuel from the one or more fuel flow loops 159, 259, etc., for fueldraulic actuation may be returned to the main fuel flow pathway 110 at any suitable point—in some cases, fuel may even be returned to the fuel tank 50, 53, although it may be more common for fuel to be retained within the engine 10 and simply recirculated within the engine 10 until it is sent to the combustor 16 to be burned. The ability to control where along the main fuel flow path 110 the fuel is returned may assist with overall engine heat management—for example, if the fuel temperature of fuel leaving the one or more actuators is below a threshold, it may be returned to a point along the flow path 110 before a fuel-oil heat exchanger, to allow the fuel temperature to be increased further before it reaches the combustor 16. By contrast, if the fuel temperature of fuel leaving the one or more actuators is above a threshold, it may be returned to a point along the flow path 110 after a fuel-oil heat exchanger, as no further heat input to the fuel may be desired, and optionally also at a point downstream of an engine pump so as to reduce a risk of thermal damage to the pump.

In implementations with multiple heat exchangers along the main fuel flow path 110, the valve 1804a can be configured to direct fuel to pass through or avoid one or more of the heat exchangers.

The generator HMS 1900 can be independent from the engine HMS 1700. It provides cooling to an electrical machine that is used, for example, to supply the airframe with electrical power for operating aircraft systems. The generator HMS 1900 comprises one or more generator HMS valves 1904a, 1904a' which are controlled by one or more actuators 1904, 1904'. In various implementations, one or more of these actuators 1904, 1904' are fueldraulically driven.

For example, in some implementations, the generator HMS 1900 comprises a single valve and a single actuator which is fueldraulically driven.

The generator HMS 1900 system may comprise a plurality of heat exchangers arranged in a parallel configuration. A single valve controlled by a single fueldraulic actuator may enable the use (or bypass) of the heat exchangers. In some implementations, each heat exchanger has an associated valve controlled by an associated actuator. In various implementations, one or more of these actuators are fueldraulically driven.

Figure 28:
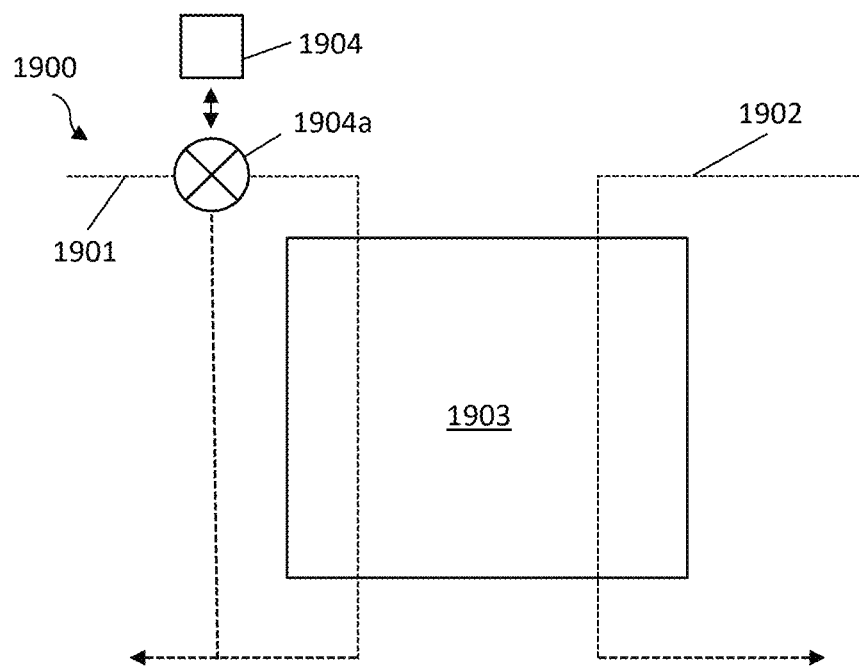
FIG. 28 is a schematic representing a generator heat management system comprising an oil-side valve operable using a fueldraulic actuator.

FIG. 28 shows a schematic view of a section of a generator HMS 1900. The generator HMS 1900 comprises an oil-air heat exchanger 1903 configured to transfer heat away from oil within the engine, and more specifically to transfer heat away from oil which is being used to cool—and optionally also lubricate—the generator. The generator HMS 1900 comprises an oil-line 1901 and an air-line 1902.

The generator HMS 1900 comprises a valve 1904a positioned within the oil-line 1901. The valve 1904a is configured to direct oil through the heat exchanger 1903 or to direct oil to bypass the heat exchanger 1903. The valve 1904a is controlled via an actuator 1904 which is fueldraulically driven.

The actuator 1904 is configured to actuate the valve 1904a so as to enable continuous position adjustment between an open valve position and a closed valve position, thereby continuously adjusting oil flow rate through the air-oil heat exchanger 1903. The valve 1904a and associated fueldraulic actuator 1904 are therefore configured to control the amount of oil passing through the heat exchanger 1903 so as to regulate the cooling of the oil.

In other implementations, the oil-air heat exchanger 1902 can be replaced with, or used in addition to, a fuel-oil heat exchanger. In such implementations, the actuator 1904 can be fueldraulically driven using fuel prior to said fuel being heated by the oil in the heat exchanger. Alternatively, the actuator 1904 can be fueldraulically driven using fuel after said fuel has been heated by the oil in the heat exchanger.

A valve and associated fueldraulically-controllable actuator may be provided on the air line (for an oil-air heat exchanger) or on the fuel line (for an oil-fuel heat exchanger) in addition to, or instead of, on the valve being provided on the oil line, in various implementations.

Figure 29:
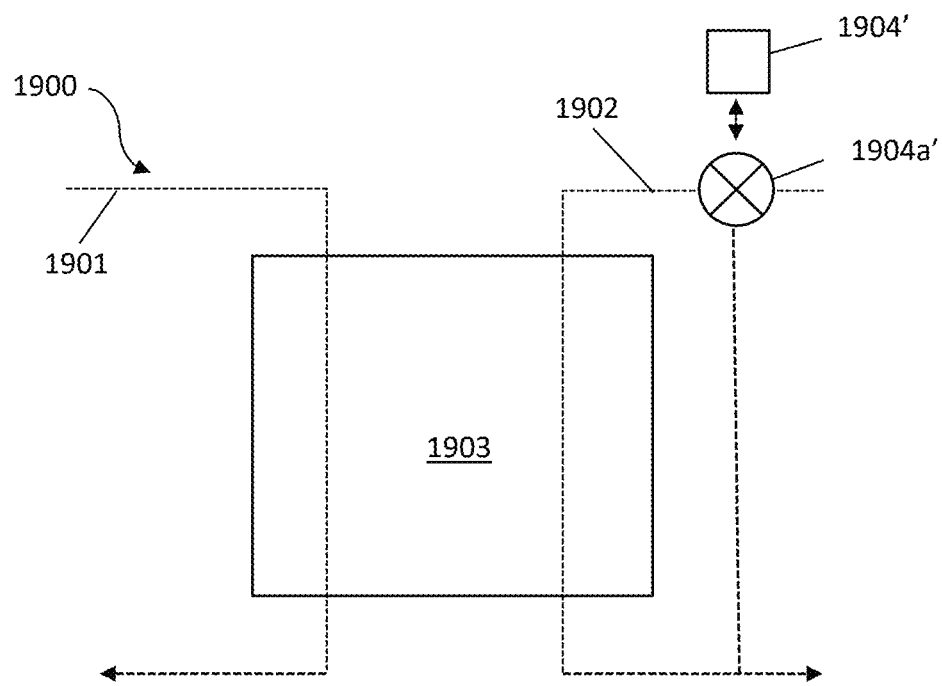
FIG. 29 is a schematic representing a generator heat management system comprising an air-side valve operable using a fueldraulic actuator.

FIG. 29 shows a schematic view of a section of a generator HMS 1900 according to one such alternative implementation. The generator HMS 1900 comprises an oil-air heat exchanger 1903 configured to transfer heat away from oil within the engine and more specifically to transfer heat away from oil which is being used to cool—and optionally also lubricate—the generator. The generator HMS 1900 comprises an oil-line 1901 and an air-line 1902.

The generator HMS 1900 comprises a valve 1904a' positioned within the air-line 1902. The valve 1904a' is configured to direct air through the heat exchanger 1903 or to direct air to bypass the heat exchanger 1903. The valve 1904a' is controlled via an actuator 1904' which is fueldraulically driven.

The actuator 1904' is configured to actuate the valve 1904a' so as to enable continuous position adjustment between an open valve position and a closed valve position. The valve 1904a' and associated fueldraulic actuator 1904' are therefore configured to control the amount of air passing through the heat exchanger 1903 so as to regulate the cooling of the oil.

In alternative implementations, the generator HMS of FIGS. 28 and 29 can be combined such that the generator HMS 1900 comprises a valve actuated via a fueldraulic actuator in both the air-line and the oil-line.

In FIGS. 28 and 29 the heat exchanger 1903 is a parallel flow heat exchanger. In other implementations, the heat exchanger 1903 can be a counter-flow heat exchanger, meaning the direction of flow of either the air-line or oil-line is reversed.

Figure 30:
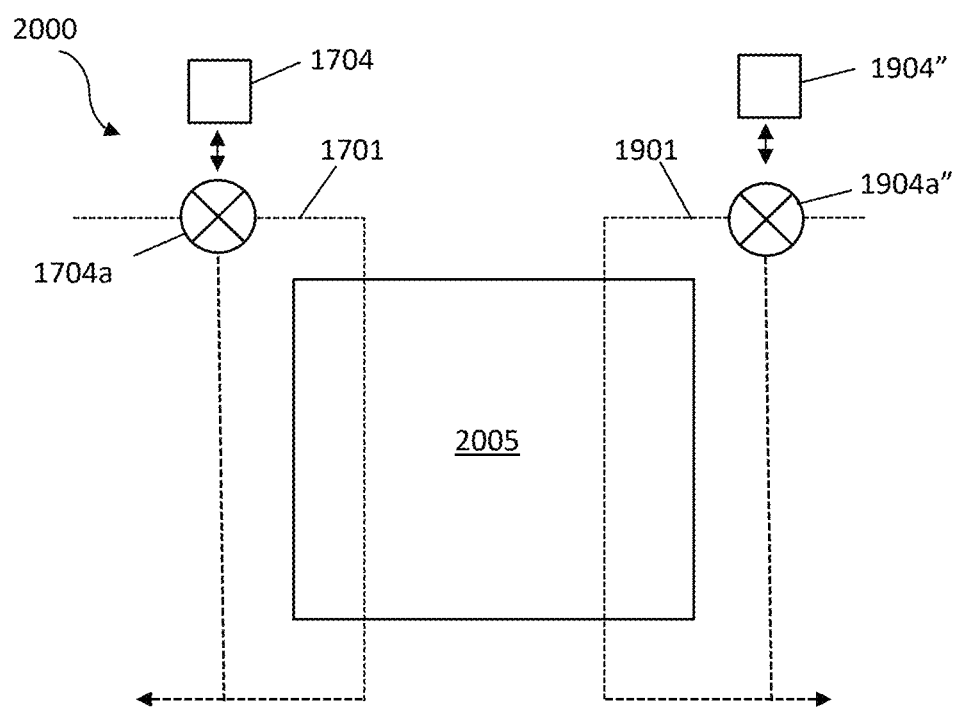
FIG. 30 is a schematic representing an engine oil-generator oil heat exchanger comprising valves operable via fueldraulic actuators.

FIG. 30 shows a schematic view of a section of a combined HMS 2000. The combined HMS 2000 comprises an oil-oil heat exchanger 2005 configured to enable heat transfer between the oil in the generator HMS 1900 (which may be referred to as generator oil, for brevity) and the oil in the engine HMS 1700 (which may be referred to as main engine oil, for brevity). Heat may therefore be transferred between the two systems—effectively combining them into a single, combined, heat management system—whilst keeping the oils fluidly isolated.

In FIG. 30 the heat exchanger 2005 is a parallel flow heat exchanger. In other implementations, the direction of flow of either fluid through the heat exchanger may be reversed and the heat exchanger 2005 can therefore be a counter-flow heat exchanger.

Main engine oil travels into the heat exchanger 2005 via the oil-line 1701 of the engine HMS 1700. In some implementations, the oil-line 1701 comprises a valve 1704 configured to divert some or all of the oil to bypass the heat exchanger 2005. This valve 1704 can be operated using an actuator 1704' which is fueldraulically driven.

Generator oil travels into the heat exchanger 2005 via the oil-line 1901 of the Generator HMS 1900. In some implementations, the oil-line 1901 comprises a valve 1904a" configured to divert some or all of the oil to bypass the heat exchanger 2005. This valve 1904a" can be operated using an actuator 1904" which is fueldraulically driven.

Various methods for operating a gas turbine engine for an aircraft are described below.

Figure 31:
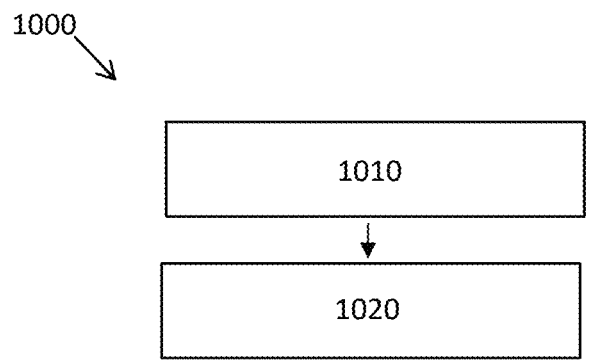
FIG. 31 is a flowchart representing an example method of operating a gas turbine engine.

FIG. 31 shows a flowchart representing a method 1000 of operating a gas turbine engine 10 according to various implementations. The method 1000 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle (21 surrounding the fan 23 and the engine core 11 and defining a bypass duct 22 located radially outside of the engine core 11; a plurality of actuators 254; and a fuel supply system 152.

In the implementations being described, a bypass ratio, defined as the ratio of the mass flow rate of the flow through the bypass duct 22 to the mass flow rate of the flow through the core 11 at cruise conditions, is greater than, or equal to, 4. Such bypass ratios may be used in any of the engines used to perform any of the methods of FIGS. 31-35.

The method 1000 comprises:
- supplying 1010, using the fuel supply system 152, fuel for combustion in the combustor 16; and
- supplying 1020, using the fuel supply system 152, fuel to fueldraulically drive at least ten of the plurality of actuators 254.

The at least ten actuators 254 may comprise:
- Either of the at least two valves 554a, b within the VSV system 556;
- Either of the at least two valves 654a, 654a' within the TCC system 656;
- Any of the at least three valves 754a, 754a', 754a" within the HMU 756;
- The ventilation valve actuator 854;
- The nacelle anti-icing valve actuator 954 or any other anti-icing valve actuator;
- The bleed air actuator 1054;
- The conditioning pack actuator 1154;
- The high stage valve actuator 1254;
- The actuator 1354 for controlling the valve for extraction of bleed air from non-compressor parts of the engine;
- The APU bleed air actuator 1454;
- The engine start valve actuator 1554;
- The isolation valve actuator 1654;
- Any of the actuators 1704, 1704' of the engine heat management system 1700; and/or
- Any of the actuators 1904, 1904' of the generator heat management system 1900.

The fuel used to fueldraulically drive one or more of the actuators 254 may then be supplied to the combustor 16 to be burned. Fuel may flow along a main fuel flow path 110 to the combustor 16—the main fuel flow path 110 may therefore supply 1010 the fuel to the combustor 16. A portion of the fuel flowing along the main fuel flow path 110 may be diverted off the main fuel flow path 110 to the actuators 254—this fuel may then be returned to the main fuel flow path 110 after its use in actuation. One or more pipes 159, 160 may be used to take fuel from the main fuel flow path 110 to the actuators 254. These pipes may form one or more fuel flow loops. One or more valves may be used to control the fuel flow rate through the, or each, fueldraulic fuel flow loop. In some implementations, one or more fueldraulic fuel pumps may be provided to actively pump the fuel to or from the actuators 254—however, in many implementations, the pressure provided by one or more fuel pumps on the main fuel flow path 110 may suffice.

The offtake 159 from the main fuel flow path 110 may be located at a different point along the main fuel flow path 110 from the return pipe 160 of the (or each) fuel flow loop. The fuel may be returned to the main fuel flow path 110 at a location upstream of, or downstream of, the offtake. One or more valves may be used to control the location(s) along the main fuel flow path 110 at which the fuel used to drive the actuators is returned to the main fuel flow path 110. For example, fuel used in actuation may be returned to a fuel tank 50, 53, to just before the combustor 16, or to before or after any fuel-oil heat exchanger or fuel pump, as appropriate. In general, fuel used in actuation is returned to a point on the main fuel flow path 110 within the engine 10 (as opposed to being returned directly to a fuel tank 50, 53 lying elsewhere in the aircraft 1, or to a connecting pipe therebetween, for example).

The supplying steps 1010, 1020 may therefore comprise controlling a plurality of fuel flow valves, and optionally also a plurality of fuel pumps.

When no actuation is demanded, the percentage of fuel redirected to the actuators can be 0%.

The fuel flow rate to the actuators under idle conditions is generally equal to or even higher than the flow rate to the combustor 16 at idle conditions, for example being between one times and 5.5 times the fuel flow rate to the combustor 16.

The flow rate to the actuators under cruise conditions is generally lower than the flow rate to the combustor 16 or similar thereto, for example being between 0.26 times and 1.1 times the fuel flow rate to the combustor 16.

Figure 32:
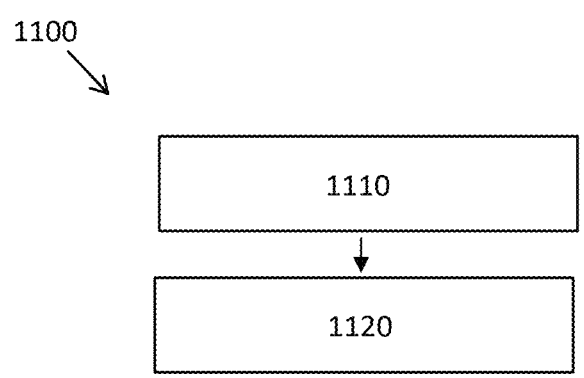
FIG. 32 is a flowchart representing a further example method of operating a gas turbine engine.

FIG. 32 shows a flowchart representing a method 1100 of operating a gas turbine engine 10 according to various implementations. The method 1100 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; a nacelle 21 surrounding the fan 23 and the engine core 11 and defining a bypass duct 22 located radially outside of the engine core 11; a plurality of actuated engine systems 356, 456, 556, 656, 756 including a heat management system 1700, 1900 and a turbine case cooling system 656; and a fuel supply system 152.

The method 1100 comprises:
supplying 1110, using the fuel supply system, fuel for combustion in the combustor; and
supplying 1120, using the fuel supply system, fuel to fueldraulically drive at least three of the plurality of actuated engine systems.

The at least three actuated engine system may comprise one or more of:
The VSV system 556;
The TCC system 656;
The HMU 756;
The engine heat management system 1700;
The generator heat management system 1900; and/or
Any of the bleed air systems.

The fuel flow rate to each actuator within the heat management system may be 0-15% of the fuel flow rate to the combustor 16 during cruise conditions.

The fuel flow rate to each actuator within the heat management system may be 0-150% of the fuel flow rate to the combustor 16 during idle conditions.

In some implementations, there may be between 1 and 5 fueldraulic actuators in the heat management system.

The fuel flow rate to the TCC system may be 0-30%, and optionally in the range 0-20%, of the fuel flow rate to the combustor 16 during cruise conditions.

The fuel flow rate to the TCC system may be 0-150%, and optionally in the range 0-75%, of the fuel flow rate to the combustor 16 during idle conditions.

As described with respect to the method 1000 of FIG. 31, one or more fuel flow loops and associated valves may be used to control how much fuel is diverted from a main fuel flow path 110 to the actuated systems, and to where along the main fuel flow path 110 that fuel is returned.

Figure 33:
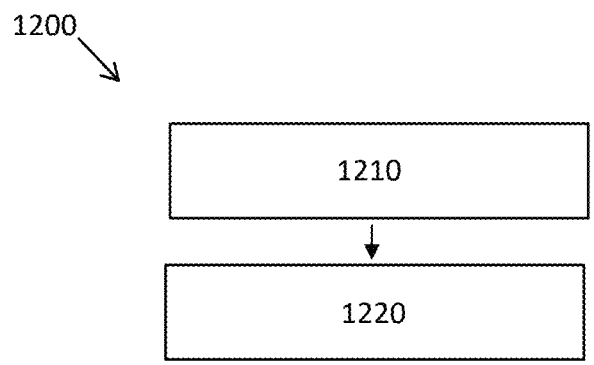
FIG. 33 is a flowchart representing a further example method of operating a gas turbine engine.

FIG. 33 shows a flowchart representing a method 1200 of operating a gas turbine engine according to various implementations. The method 1200 is performed for an engine 10 comprising:
an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; a nacelle 21 surrounding the fan 23 and the engine core 11 and defining a bypass duct 22 located radially outside of the engine core 11; a plurality of actuators (any or all of actuators 954, 1054, 1154, 1254, which may be denoted more generally as 254), wherein at least one of the plurality of actuators is configured to actuate a bleed air valve 954a, 1054a, 1154a, 1254a; and a fuel supply system 152.

The method 1200 comprises:
supplying 1210, using the fuel supply system 152, fuel for combustion in the combustor 16; and
supplying 1220, using the fuel supply system 152, fuel to fueldraulically drive the at least one actuator 954, 1054, 1154, 1254 configured to actuate the bleed air valve 954a, 1054a, 1154a, 1254a.

The bleed air valve may be any other bleed air valves described above. For example, the bleed air valve may be an anti-icing valve. The bleed air valve may be a high stage valve. The bleed air valve may be a manifold pressure valve. The bleed air valve may be a high-pressure bleed valve, an intermediate pressure valve, or a bypass duct.

As described with respect to the methods 1000, 1100 of FIGS. 31 and 32, one or more fuel flow loops and associated valves may be used to control how much fuel is diverted from a main fuel flow path 110 to the actuated systems, and to where along the main fuel flow path 110 that fuel is returned.

Figure 34:
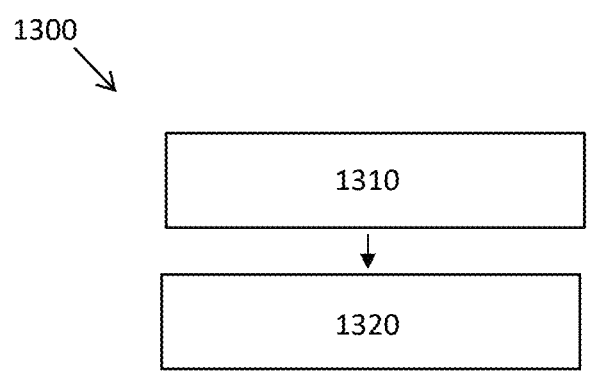
FIG. 34 is a flowchart representing a further example method of operating a gas turbine engine.

FIG. 34 shows a flowchart representing a method 1300 of operating a gas turbine engine according to various implementations. The method 1300 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; a nacelle 21 surrounding the fan 23 and the engine core 11 and defining a bypass duct 22 located radially outside of the engine core 11; an engine heat management system 1700; a plurality of actuators, comprising an actuator 1704, 1704' configured to actuate a valve 1704a, 1704a' within the engine heat management system 1700, wherein the actuator 1704, 1704' configured to actuate a valve 1704a, 1704a' within the engine heat management system 1700 is configured to actuate said valve 1704a, 1704a' so as to enable non-binary position adjustment between an open valve position and a closed valve position; and a fuel supply system 152.

The method 1300 comprises:
supplying 1310, using the fuel supply system 152, fuel for combustion in the combustor 16; and
supplying 1320, using the fuel supply system 152, fuel to fueldraulically drive at least the engine heat management system valve actuator 1704', 1704a' of the plurality of actuators.

The engine 10 of some implementations comprise multiple actuators 1704, 1704' each configured to actuate a valve 1704a, 1704a' within the engine HMS 1700, and the method 1300 of such implementations may comprise fueldraulically actuating multiple such actuators, using the fuel supply system 152.

The engine HMS system 1700 can control the temperature of the oil system that lubricates components of the engine (e.g., bearing chambers, gearbox, etc). The engine HMS system 1700 comprises one or more engine HMS valves 1704a, 1704a' which are controlled by one or more fueldraulic actuators 1704, 1704'.

As described with respect to the methods 1000, 1100, 1200 of FIGS. 31-33, one or more fuel flow loops and associated valves may be used to control how much fuel is diverted from a main fuel flow path 110 to the actuated systems, and to where along the main fuel flow path 110 that fuel is returned.

Figure 35:
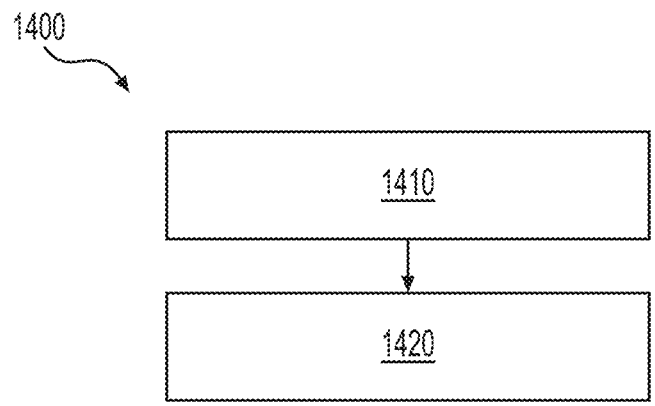
FIG. 35 is a flowchart representing a further example method of operating a gas turbine engine.

FIG. 35 shows a flowchart representing a method 1400 of operating a gas turbine engine according to various implementations. The method 1400 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; a nacelle 21 surrounding the fan 23 and the engine core 11 and defining a bypass duct 22 located radially outside of the engine core 11; a generator heat management system 1900; a plurality of actuators, comprising an actuator 1904, 1904' configured to actuate a valve 1904a, 1904a' within the generator heat management system 1900, wherein the actuator 1904', 1904a' configured to actuate a valve 1904a, 1904a' within the generator heat management system 1900 is configured to actuate said valve 1904a, 1904a' so as to enable non-binary position adjustment between an open valve position and a closed valve position; and a fuel supply system 152

The method 1400 comprises:
supplying 1410, using the fuel supply system 152, fuel for combustion in the combustor 16; and
supplying 1420, using the fuel supply system 152, fuel to fueldraulically drive at least the generator heat management system valve actuator 1904, 1904' of the plurality of actuators.

The engine 10 of some implementations comprise multiple actuators 1904, 1904' each configured to actuate a valve 1904a, 1904a' within the generator HMS 1900, and the method 1400 of such implementations may comprise fueldraulically actuating multiple such actuators, using the fuel supply system 152.

The generator HMS 1900 can be independent from the engine HMS 1700. It can provide cooling to an electrical machine that is used, for example, to supply the airframe with electrical power for operating aircraft systems. The generator HMS 1900 comprises one or more generator HMS valves 1904a, 1904a' which are controlled by one or more fueldraulic actuators 1904, 1904'.

As described with respect to the methods 1000, 1100, 1200, 1300 of FIGS. 31 to 34, one or more fuel flow loops and associated valves may be used to control how much fuel is diverted from a main fuel flow path 110 to the actuated systems, and to where along the main fuel flow path 110 that fuel is returned.

It will be understood that the invention is not limited to the implementations above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
an engine core comprising a turbine, a combustor, a compressor, and a core shaft connecting the turbine to the compressor;
a fan upstream of the engine core and arranged to be driven by the core shaft, the fan comprising a plurality of fan blades;
a nacelle surrounding the fan and the engine core and defining a bypass duct radially outside of the engine core, where a bypass ratio, defined as the ratio of the mass flow rate of the flow through the bypass duct to the mass flow rate of the flow through the core at cruise conditions, is at least 4;
a plurality of actuators; and
a fuel supply system, wherein
the fuel supply system is arranged to supply fuel for combustion in the combustor, and to supply the fuel to fueldraulically drive at least ten of the plurality of actuators,
the fuel comprises sustainable aviation fuel with up to 100% of the fuel being the sustainable aviation fuel;
the fuel supply system comprises a hydro-mechanical unit comprising a fuel return-to-tank valve controlled using a fuel return-to-tank actuator configured to regulate the supplied fuel for combustion in the combustor, the fuel return-to-tank actuator being one of the at least ten of the plurality of actuators; and
the fuel supply system is arranged to supply the fuel to fueldraulically drive the fuel return-to-tank actuator based on calorific value of the fuel.

2. The gas turbine engine of claim 1, wherein the fuel supply system is arranged to supply the fuel to fueldraulically drive at least eleven of the plurality of actuators.

3. The gas turbine engine of claim 1, wherein the engine comprises a variable stator vane system, at least two of the plurality of actuators are a part of the variable stator vane system, and the fuel supply system is arranged to supply the fuel to fueldraulically drive the at least two of the plurality of actuators which are part of the variable stator vane system.

4. The gas turbine engine of claim 1, wherein the engine comprises a turbine case cooling system, at least two of the plurality of actuators are a part of the turbine case cooling system, and the fuel supply system is arranged to supply the fuel to fueldraulically drive the at least two of the plurality of actuators which are part of the turbine case cooling system.

5. The gas turbine engine of claim 1, wherein the engine comprises a ventilation valve actuator, and the fuel supply system is arranged to supply the fuel to fueldraulically drive the ventilation valve actuator.

6. The gas turbine engine of claim 1, wherein the engine comprises an engine heat management system, and at least one of the plurality of actuators is a part of the engine heat management system, and the fuel supply system is arranged to supply the fuel to fueldraulically drive the at least one of the plurality of actuators which is part of the engine heat management system.

7. The gas turbine engine of claim 1, wherein the engine comprises a generator heat management system, and at least one of the plurality of actuators is a part of the generator heat management system, and the fuel supply system is arranged to supply the fuel to fueldraulically drive the at least one of the plurality of actuators which is part of the generator heat management system.

8. The gas turbine engine of claim 1, wherein the engine comprises a hydro-mechanical unit, and at least three of the plurality of actuators are a part of the hydro-mechanical unit, and the fuel supply system is arranged to supply the fuel to fueldraulically drive the at least three of the plurality of actuators which are part of the hydro-mechanical unit.

9. The gas turbine engine of claim 8, wherein at least four of the plurality of actuators are a part of the hydro-mechanical unit, and the fuel supply system is arranged to supply the fuel to fueldraulically drive the at least four of the plurality of actuators which are part of the hydro-mechanical unit.

10. The gas turbine engine of claim 1, wherein the engine comprises a bleed air valve, at least one of the plurality of actuators is configured to actuate the bleed air valve, and the fuel supply system is arranged to supply the fuel to fueldraulically drive the at least one of the plurality of actuators configured to actuate the bleed air valve.

11. The gas turbine engine of claim 1, wherein the core shaft outputs drive to the fan directly, so as to drive the fan at the same rotational speed as core shaft, such that the engine is a direct drive turbine engine.

12. The gas turbine engine of claim 1, wherein the turbine engine comprises a gearbox that receives an input from the core shaft and outputs drive to the fan so as to drive the fan at a lower rotational speed than the core shaft, such that the engine is a geared turbine engine.

13. The gas turbine engine of claim 1, wherein the engine comprises a plurality of actuated engine systems, including a heat management system and a turbine case cooling system, and the fuel supply system is arranged to supply the fuel to fueldraulically drive at least three of the plurality of actuated engine systems.

14. The gas turbine engine of claim 13, wherein the fuel supply system is arranged to supply the fuel to fueldraulically drive at least five of the plurality of actuated engine systems.

15. The gas turbine engine of claim 14, wherein the fuel supply system is arranged to supply the fuel to fueldraulically drive at least seven of the plurality of actuated engine systems.

16. The gas turbine engine of claim 13, wherein at least one of the plurality of actuated engine systems comprises at least two of the plurality of actuators, and the fuel supply system is arranged to supply the fuel to fueldraulically drive at least one of the at least two of the plurality of actuators within the at least one of the plurality of actuated engine systems.

17. The gas turbine engine of claim 13, wherein at least one of the actuated engine systems comprises at least two of the plurality of actuators, and the fuel supply system is arranged to supply the fuel to fueldraulically drive each of the at least two of the plurality of actuators within the at least one actuated engine system.

18. The gas turbine engine of claim 1, wherein the fuel return-to-tank actuator is configured to increase an amount of fuel spilled around one or more engine fuel pumps based on at least one of an increased calorific value of the fuel and a decreased thrust demand.

19. The gas turbine engine of claim 1, further comprising:
a recirculation pipe configured to flow the fuel from a heat exchanger outlet to a heat exchanger inlet.

20. A method of operating a gas turbine engine for an aircraft, the engine comprising:
an engine core comprising a turbine, a combustor, a compressor, and a core shaft connecting the turbine to the compressor;
a fan upstream of the engine core and arranged to be driven by the core shaft, the fan comprising a plurality of fan blades;
a nacelle surrounding the fan and the engine core and defining a bypass duct radially outside of the engine core, where the bypass ratio, defined as the ratio of the mass flow rate of the flow through the bypass duct to the mass flow rate of the flow through the core at cruise conditions, is at least 4;
a plurality of actuators; and
a fuel supply system that comprises a hydro-mechanical unit comprising a fuel return-to-tank valve controlled using a fuel return-to-tank actuator configured to regulate the supplied fuel for combustion in the combustor;
wherein the method comprises:
supplying, using the fuel supply system, fuel for combustion in the combustor;
supplying, using the fuel supply system, the fuel to fueldraulically drive at least ten of the plurality of actuators, wherein the fuel comprises sustainable aviation fuel with up to 100% of the fuel being the sustainable aviation fuel; and
supplying the fuel to fueldraulically drive the fuel return-to-tank actuator based on calorific value of the fuel, the fuel return-to-tank actuator being one of the at least ten of the plurality of actuators.

* * * * *